(12) United States Patent
Chen et al.

(10) Patent No.: US 12,327,551 B1
(45) Date of Patent: Jun. 10, 2025

(54) ACOUSTIC EVENT DETECTION

(71) Applicant: Amazon Technologies, Inc., Seattle, WA (US)

(72) Inventors: Xiuye Chen, Cambridge, MA (US); Qingming Tang, Waltham, MA (US); Chieh-Chi Kao, Kirkland, WA (US); Viktor Rozgic, Belmont, MA (US); Chao Wang, Newton, MA (US)

(73) Assignee: Amazon Technologies, Inc., Seattle, WA (US)

( * ) Notice: Subject to any disclaimer, the term of this patent is extended or adjusted under 35 U.S.C. 154(b) by 338 days.

(21) Appl. No.: 18/081,912

(22) Filed: Dec. 15, 2022

(51) Int. Cl.
    *G10L 15/22* (2006.01)
    *G10L 15/18* (2013.01)
(52) U.S. Cl.
    CPC .............................. *G10L 15/1815* (2013.01)
(58) Field of Classification Search
    CPC .................................................. G10L 15/1815
    See application file for complete search history.

(56) References Cited

U.S. PATENT DOCUMENTS

| 10,832,535 B1 * | 11/2020 | Capota ................ G08B 29/10 |
| 2016/0150338 A1 * | 5/2016 | Kim ...................... G08B 1/08 381/58 |

* cited by examiner

*Primary Examiner* — Ibrahim Siddo
(74) *Attorney, Agent, or Firm* — Pierce Atwood LLP

(57) ABSTRACT

A system configured to detect custom acoustic events, where the system generates an acoustic event profile for the custom acoustic event based on a natural language description and without a sample of the sound. The system may generate a profile for a new custom sound based on a natural language description provided by the user; for example, a "microwave beep." If the system does not have an existing event profile for a microwave beep, the system may ask the user questions to determine whether any existing event profiles are close (e.g., is the sound similar to a "fan," "alarm," "appliance beep," etc.). The system may detect an event that may be a possible match for the custom sound and ask the user to verify whether the detected event corresponds to the custom sound. The system may update the event profile based on the user's response.

20 Claims, 19 Drawing Sheets

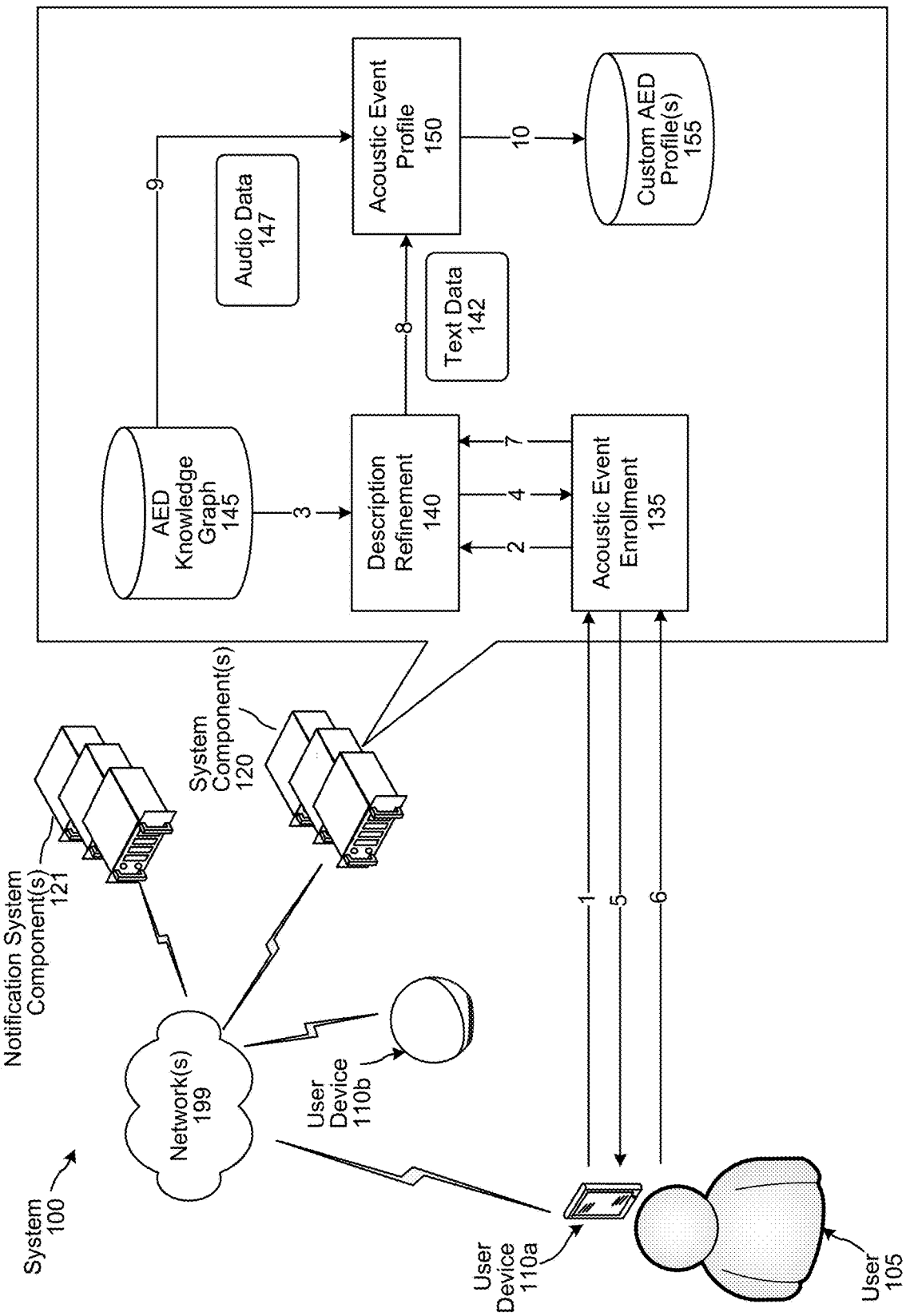

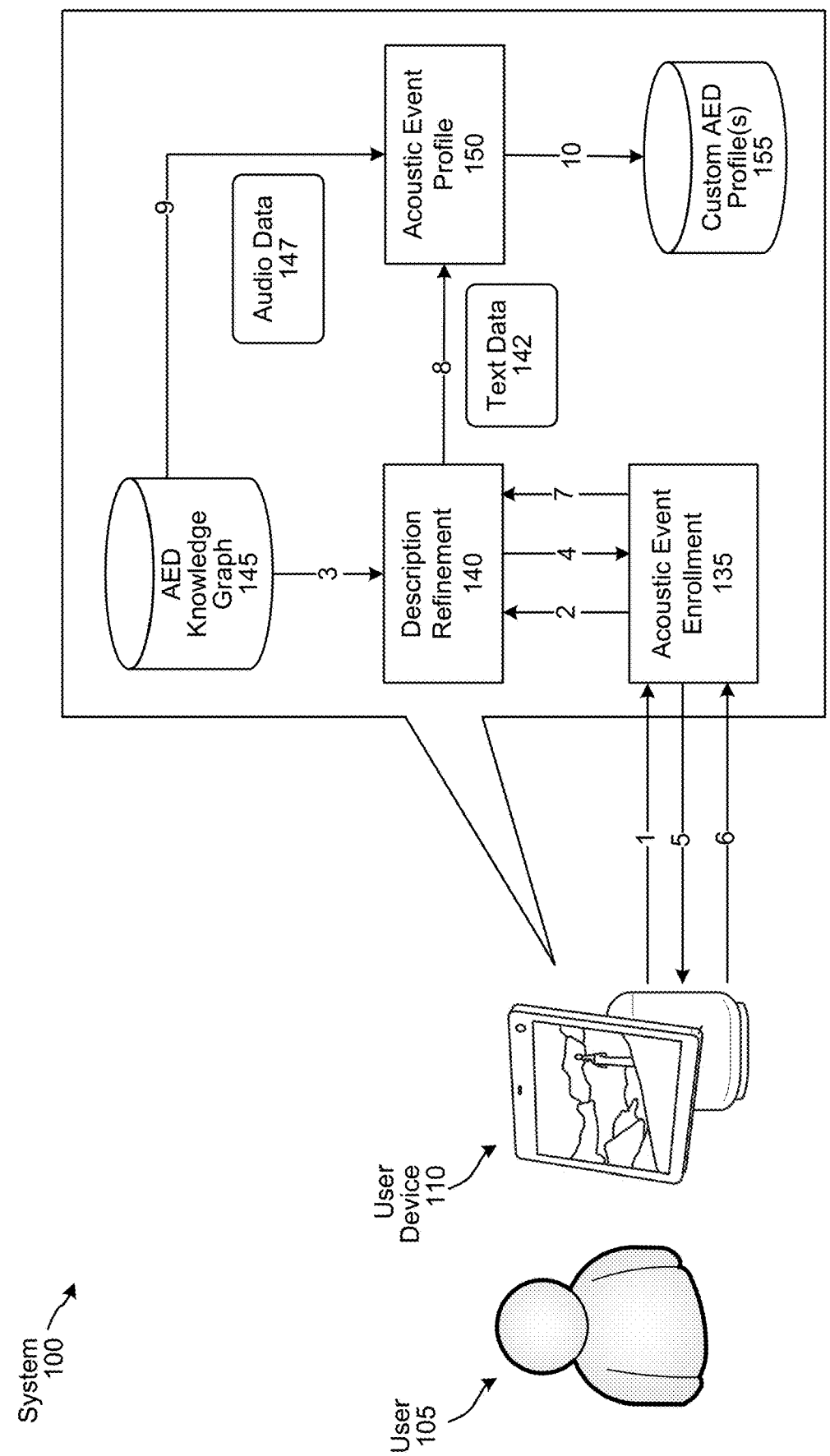

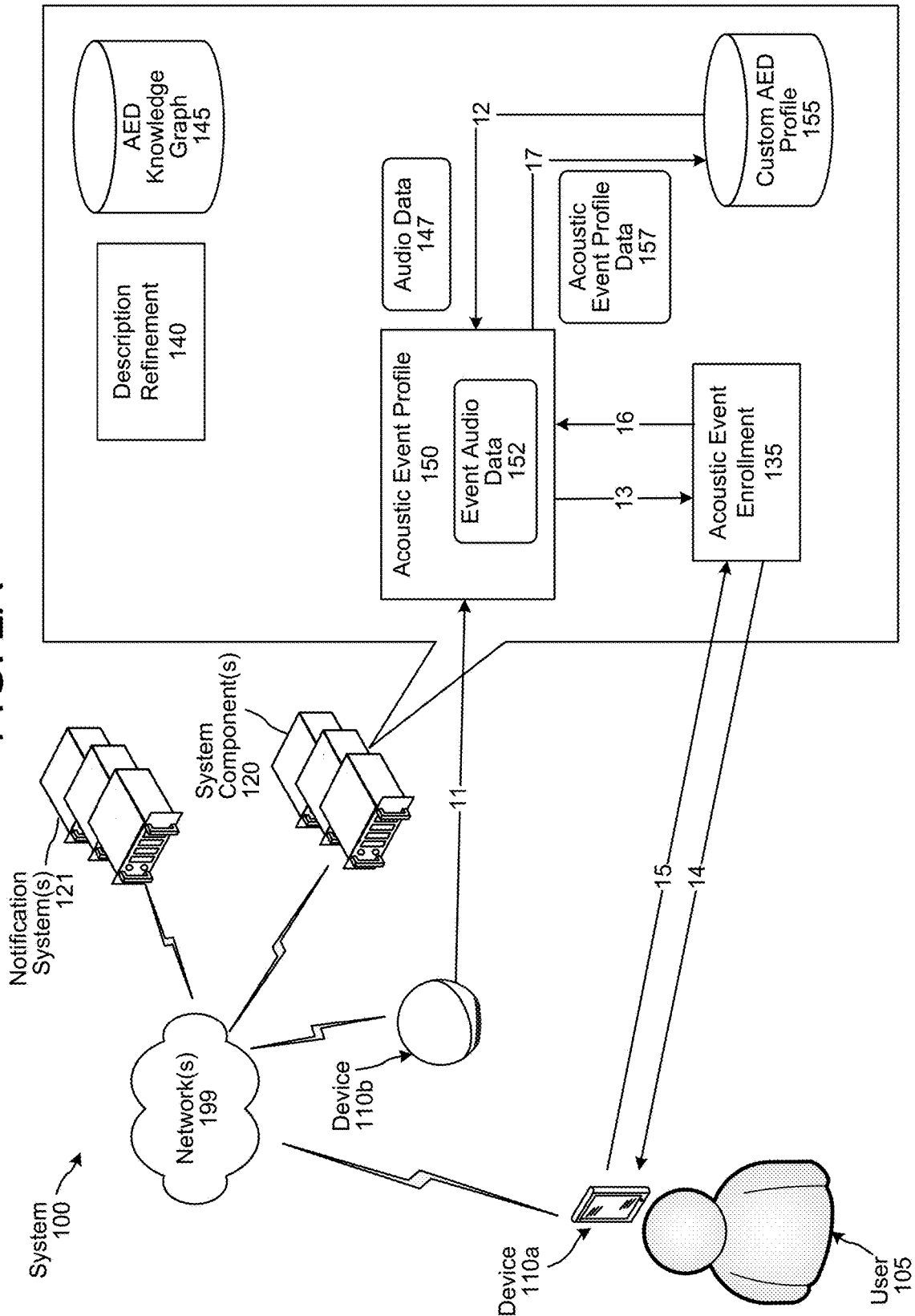

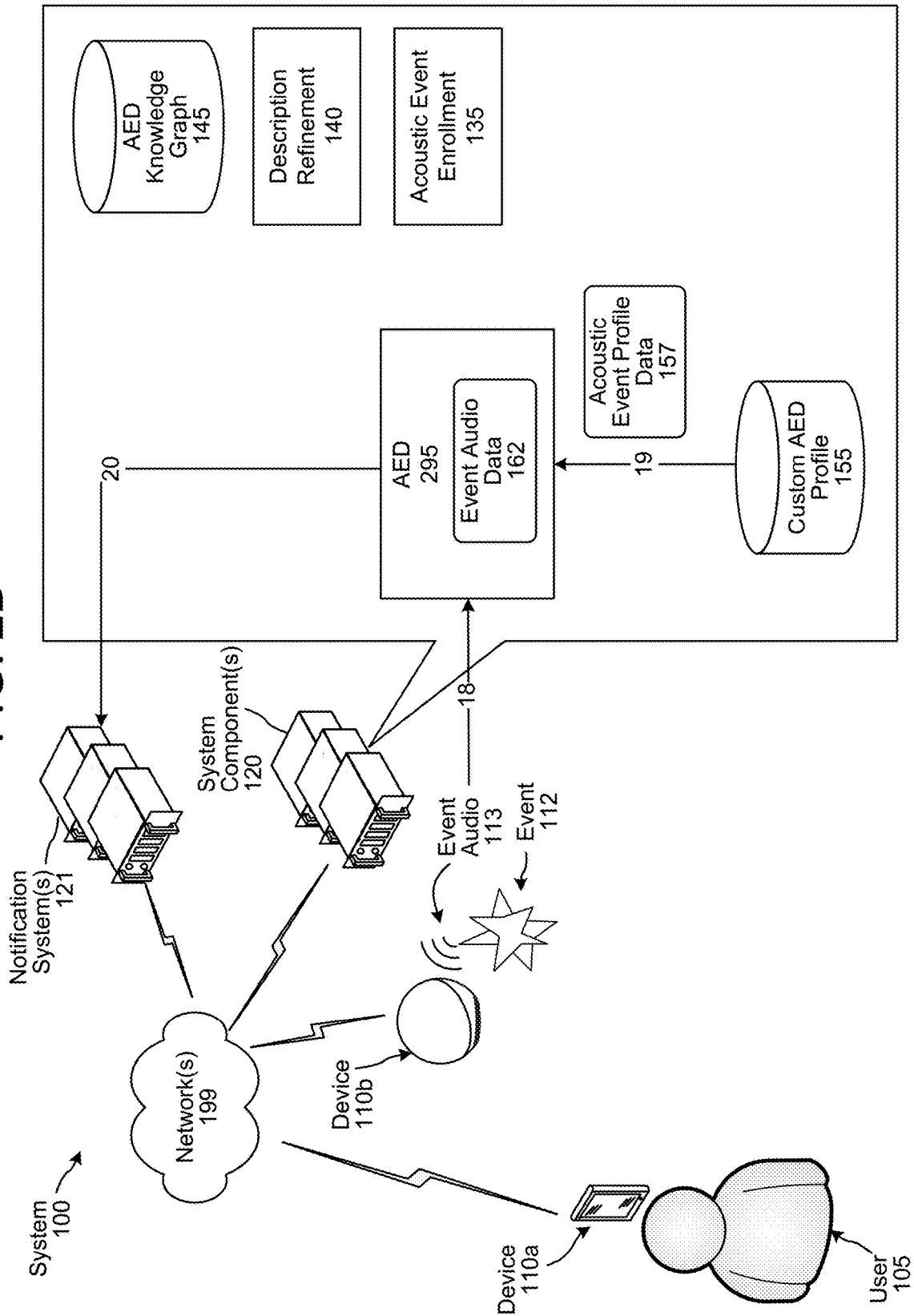

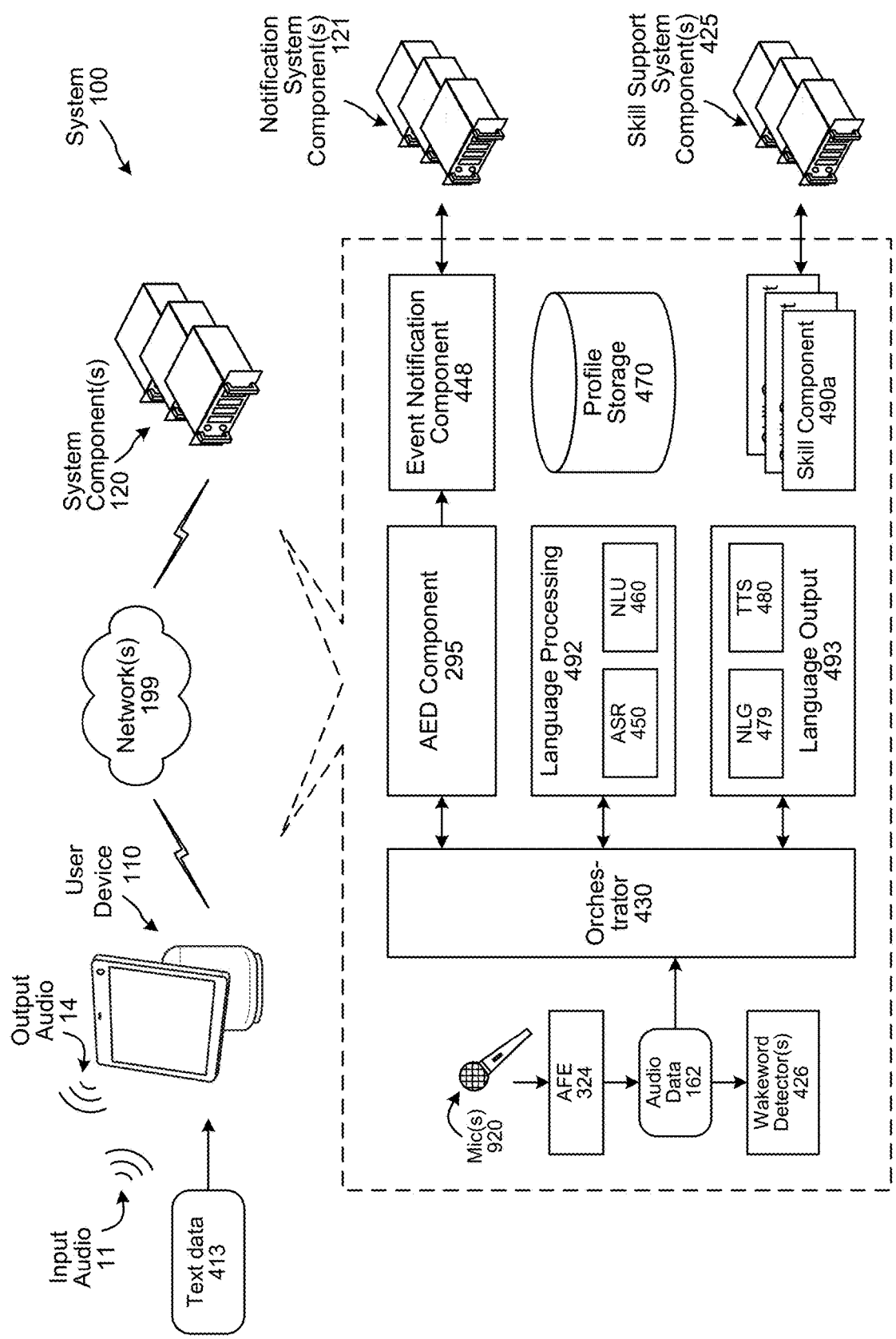

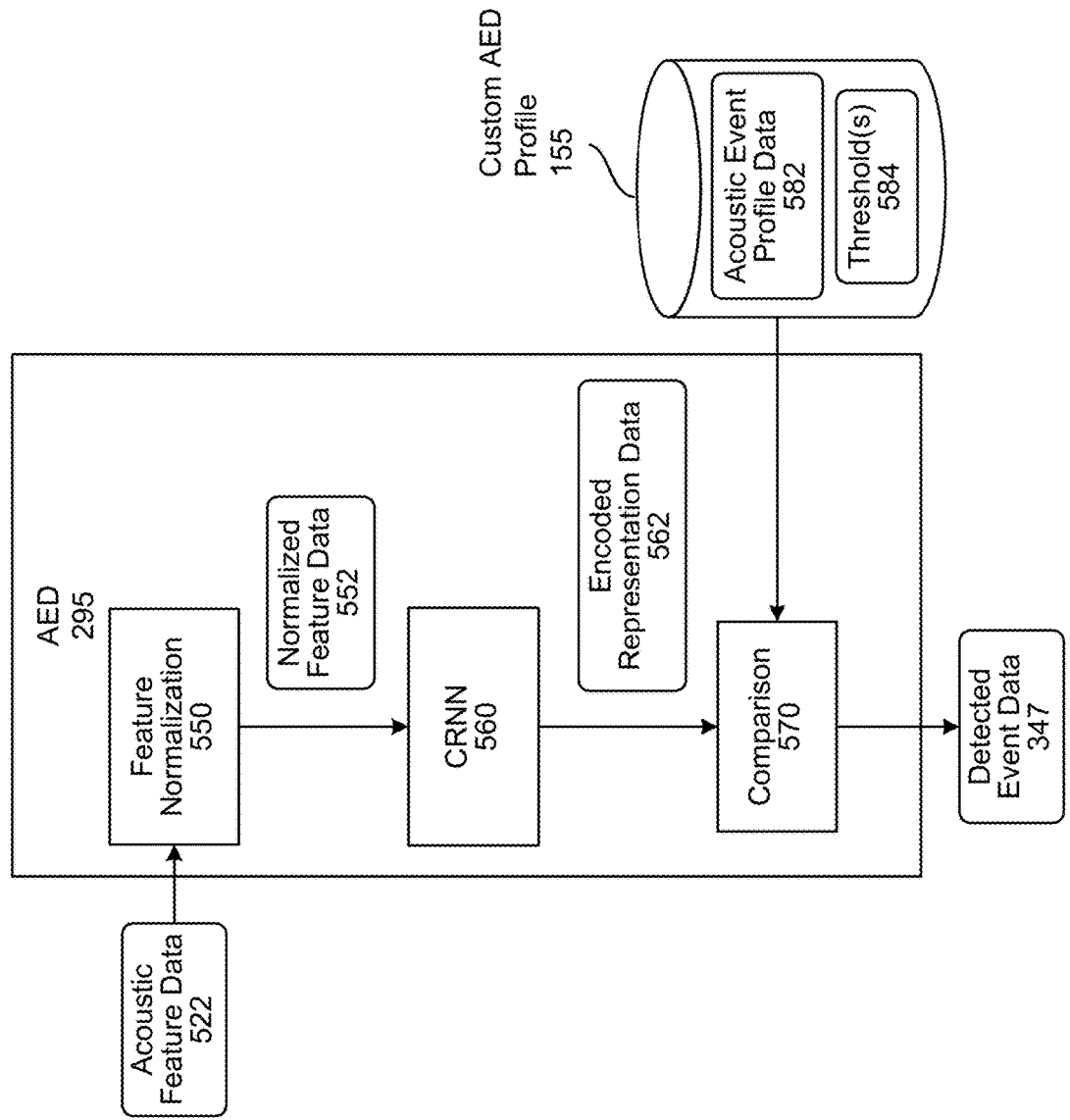

ACOUSTIC EVENT DETECTION

BACKGROUND

Computing devices may be configured to process sounds captured by a microphone and to take actions corresponding to the sound. The sounds may include non-speech events and/or human speech. An acoustic-event detection (AED) system may be configured to recognize one or more non-speech sounds. Speech-processing systems may allow a user to control computing devices using their speech. These systems identify words spoken by a user based on properties of received audio data that represents the speech of the user. Automatic speech recognition (ASR) processing combined with natural-language understanding (NLU) processing allows a speech-processing system to determine text or other type of data corresponding to the speech and to understand an intent expressed in the speech. Acoustic-event detection and/or speech processing may be used by computers, handheld devices, smart speakers, and other devices to improve human-computer interactions.

BRIEF DESCRIPTION OF DRAWINGS

For a more complete understanding of the present disclosure, reference is now made to the following description taken in conjunction with the accompanying drawings.

FIG. 1A illustrates a system configured to receive and process a request to detect a custom acoustic event, according to embodiments of the present disclosure.

FIG. 1B illustrates another implementation of a system configured to receive and process a request to detect a custom acoustic event, according to embodiments of the present disclosure.

FIG. 2A illustrates the system configured to update acoustic event profile data based on user feedback, according to embodiments of the present disclosure.

FIG. 2D illustrates the system configured to detect occurrence of the custom acoustic event, according to embodiments of the present disclosure.

FIG. 4 is conceptual diagram illustrating a user device and a system component configured for detecting an acoustic event and processing speech, according to embodiments of the present disclosure, FIG. 5 is a conceptual diagram illustrating components of an acoustic event detection (AED) component, according to embodiments of the present disclosure.

DETAILED DESCRIPTION

Figure 1C:
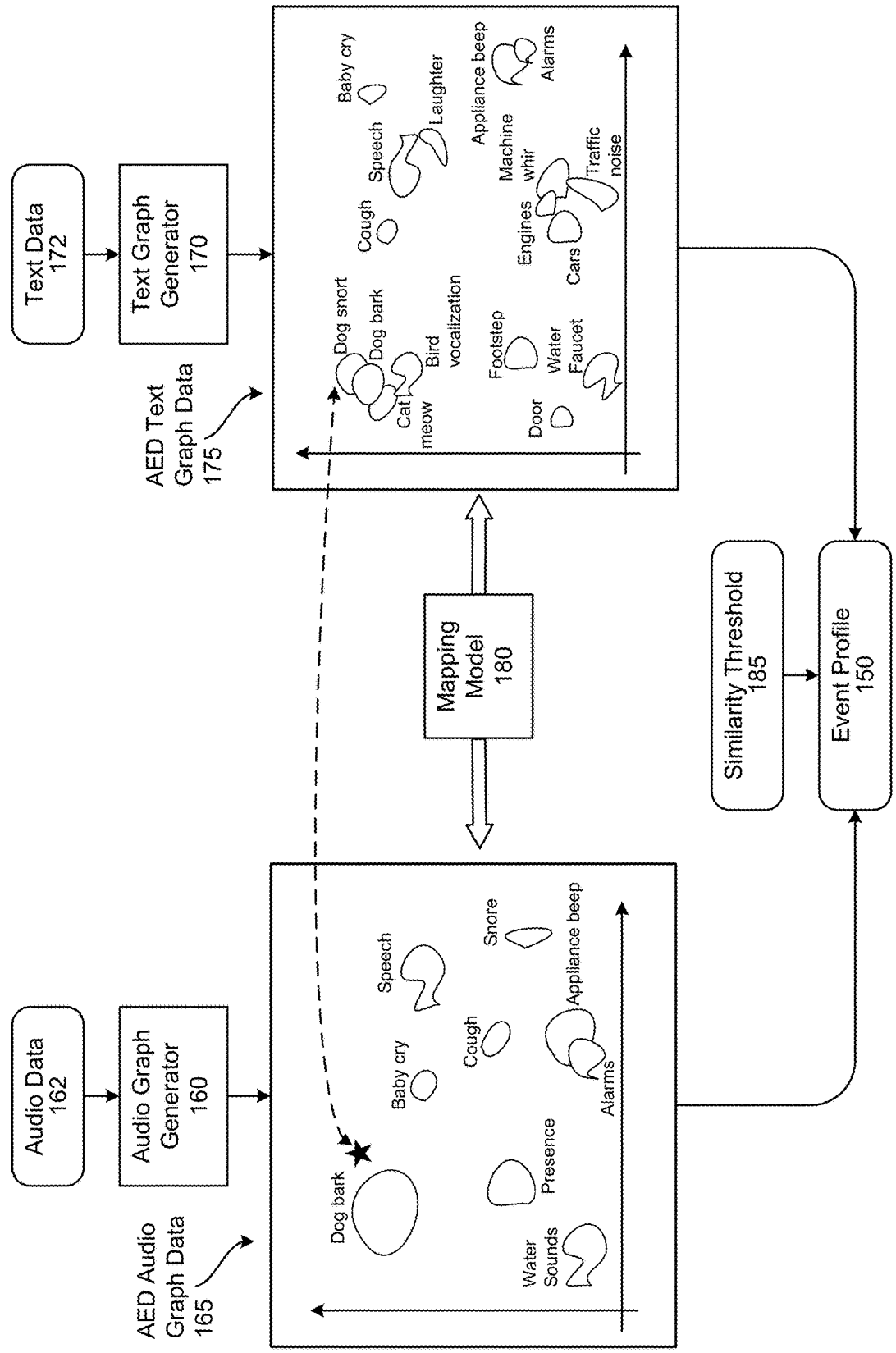
FIG. 1C is a conceptual diagram illustrating multi-view model training to align audio and text representation networks, with aligned concept space map to hierarchical knowledge graph, according to embodiments of the present disclosure.

Acoustic event detection (AED) is a field of computer science and artificial intelligence that relates to processing audio data representing a sound, such as a non-speech sound, to determine when and if a particular acoustic event is represented in the audio data. Examples of such events may include glass breaking, a baby crying, or other events. A system capable of performing AED may also be capable of performing speech processing. Automatic-speech recognition (ASR) is a field of computer science, artificial intelligence, and linguistics that relates to transforming audio data representing speech into text data representing that speech. Natural-language understanding (NLU) is a field of computer science, artificial intelligence, and linguistics that relates to enabling computers to derive meaning from the text data. Natural Language Generation (NLG) includes enabling computers to generate output text or other data in words a human can understand, such as sentences or phrases. Text-to-speech (TTS) is a field of computer science, artificial intelligence, and linguistics that relates to enabling computers to convert a representation of text into audio representing synthesized speech. ASR and/or NLU may be used together as part of a natural language processing system. In other embodiments, systems may use spoken language understanding (SLU) techniques that processes audio data representing speech and determines meaning of the speech. ASR, NLU, NLG, and TTS may be used together as part of a speech-processing/virtual assistant system. In various embodiments, the natural language processing system may process data associated with an acoustic event (e.g., audio data that includes a representation of the event and/or event data generated by the AED system) and/or speech data associated with the event and may determine a corresponding output (e.g., sending a notification to a user device).

A device and/or a system may thus be configured to process audio data to determine if properties of the audio data correspond to properties associated with an acoustic event. Examples of acoustic events include a doorbell ringing, a microwave oven beeping, a dog barking, a window pane (or other glass) breaking, and/or a door closing. The device and/or components of the larger system may process the audio data in groups of samples (e.g., time-based, frequency-based, or other portions of audio data), known as frames of audio data, to extract audio features from the audio data as it is received. The audio features may include, for example, log Mel-filterbank energy features corresponding to the audio data frames. An acoustic event detection (AED) component may process the audio features.

A voice-controlled device and/or other audio-receiving system component(s) may also be configured to receive a spoken user input and detect a wakeword and/or other text in the user input; determine a command in the user input; and provide a response to the command. A user may thus interact with the voice-controlled device, another device, and/or system by voice. In some embodiments, in response to the device detecting the wakeword, the user device may perform speech processing on audio data representing the speech of the user, and/or send the audio data to the system for processing. The system may further process the audio data to verify that it includes a representation of the wakeword and/or to determine the command and/or response. The device may then receive, from the system, output audio, video, or other data related to the response and/or other data required to perform an action associated with the response (e.g., a command to turn on a light).

An AED component may be configured to detect occurrence of some predefined acoustic events, such as, glass breaking, fire/smoke alarm, etc. Such "predefined" events may correspond to events that may sound similar across acoustic environments in which they may be heard and thus may be detectable by a globally trained/configured AED component that is then operable by a device with little to no customization. Another AED component may be configured to detect custom acoustic events defined by a user. Such custom acoustic events may be defined using audio samples of the acoustic event. For example, an AED component may be configured to detect a particular dog's bark using audio samples of that dog barking, the sound of a particular beeping appliance, the sound of a particular door opening/closing, or the like.

The present disclosure relates to using a natural language description of a custom acoustic event to identify audio samples that potentially represent the custom event. A system of the present disclosure receives a natural language description, from a user, of the custom acoustic event. For example, a "microwave beep." The system may refine the user-provided natural language description to determine a more specific version by requesting additional information from the user. For example, the user may provide the natural language description "dog barking", and the system may determine, based on additional information provided by the user, the natural language description "[breed] puppy barking." The system then identifies audio of a sample acoustic event corresponding to the determined natural language description, and may use the identified audio to detect occurrence of the custom acoustic event.

In some cases, however, the system may not identify any event profiles that match the natural language description with a certain threshold level of similarity and/or confidence. Offered herein are techniques for configuring an AED system to detect a custom sound based on a natural language description, even in the absence of an existing event profile and a sample of the sound. The system may generate a profile for a new custom sound based on a natural language description provided by the user; for example, a "microwave beep." If the system does not have an existing event profile for a microwave beep, the system may ask the user questions to determine whether any existing event profiles are close (e.g., what is the brand of microwave, does the microwave sound similar to other appliances in your home, would you describe the sound more like a "musical tune," "alarm," "appliance beep," etc.). Based on user responses, the system may generate a custom event profile that associates the user's natural language description of the sound with data (e.g., audio embeddings) representing sounds the user indicates are similar.

The system may detect one or more possible matches for the custom sound, and ask the user to verify whether the detected event(s) correspond to the custom sound. Based on the user feedback, the system may update the custom event profile. For example, if the user states that the detected event is not a match, the system may update the custom event profile by adjusting an audio embedding representing the custom sound (e.g., generating a new vector or other data structure representing the custom sound) relative to an audio embedding representing the detected event and/or adjusting the confidence threshold for detection (e.g., making the threshold such that more sounds will be considered a "match" even if it sounds a bit different, such as in a small space where an echo is more likely to distort the sound). If, however, the user states that the detected event is a match, the system may update the custom event profile by adjusting the audio embedding representing the custom sound toward the audio embedding representing the detected event and/or raising the confidence threshold for detection (e.g., requiring a closer match to trigger notification of the detected event).

The system may use federated learning techniques to preserve user privacy and avoid sharing user audio with other devices/components of the system. The user device may calculate gradients that represent changes to event profiles and/or on-device computer models (e.g., the audio encoder, text encoder, etc.) and share the gradients with other devices/system components rather than audio data received by the user device.

Teachings of the present disclosure may be configured to incorporate user permissions and may only perform activities disclosed herein if approved by a user. These permissions may include a grant (or denial) to use a particular component/method. The systems, devices, components, and techniques described herein may thus be configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

Figure 1D:
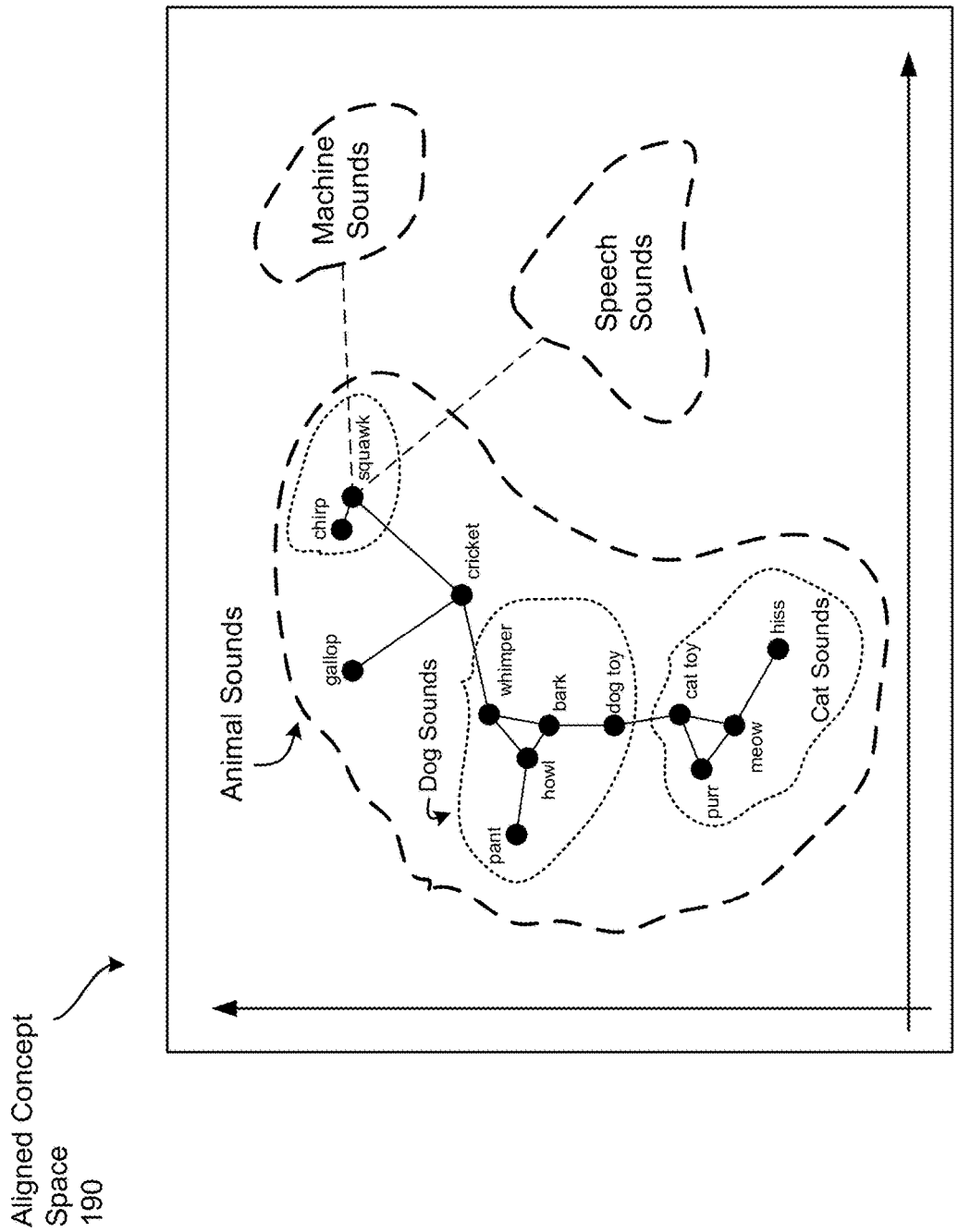
FIG. 1D is a conceptual diagram illustrating an aligned concept space representing mappings between the text data represented in the AED text graph data 175 and the audio data represented in the AED audio graph data 165, according to embodiments of the present disclosure.

FIG. 1A illustrates a system 100 configured to receive and process a request to detect a custom acoustic event, according to embodiments of the present disclosure. FIG. 1B illustrates another implementation of a system configured to receive and process a request to detect a custom acoustic event, according to embodiments of the present disclosure. FIG. 1C is a conceptual diagram illustrating multi-view model training to align audio and text representation networks, with aligned concept space map to hierarchical knowledge graph, according to embodiments of the present disclosure. FIG. 1D is a conceptual diagram illustrating an aligned concept space representing mappings between the text data represented in the AED text graph data and the audio data represented in the AED audio graph data, according to embodiments of the present disclosure. Although the figures and discussion of the present disclosure illustrate certain operational steps of the system in a particular order, the steps described may be performed in a different order (as well as certain steps removed or added) without departing from the intent of the disclosure.

Some embodiments involve use of one or more knowledge graphs to determine natural language descriptions of a custom acoustic event and to identify audio data corresponding to the natural language descriptions. A knowledge graph such as the AED knowledge graph 145 shown in FIG. 1A may be used to integrate information from various data sources, model underlying relationships between the information, among other things. A knowledge graph can encode or otherwise represent knowledge in a form that is amenable to automated analysis, inference, and information retrieval. Some embodiments of the present disclosure use an AED-specific knowledge graph to represent hierarchical relationships of different acoustic events such that similar acoustic events (such as "dog bark" and "dog whimper") are interlinked together and dissimilar events (such as "cat meow" and "machine whir") are far apart. The knowledge graph may be represented by data, such as one or more tables of data, representing nodes of individual sounds/descriptions thereof and arcs connecting those sounds.

One knowledge graph, referred to herein as AED text graph, may integrate natural language descriptions (e.g., text data) of acoustic events. The natural language descriptions may be derived from various public sources (as described below) and/or other sources to build a comprehensive AED domain knowledge using text embeddings. Such an approach is advantageous because it uses natural language processing (NLP) representation learning to acquire label representations from rich text data that comprehensively describes different acoustic events. Using the relationships between the natural language descriptions, relationships between the acoustic events can be inferred, even when an audio sample of the acoustic event is not available.

Some embodiments incorporate a "conversational machine", which systematically prompts follow-up questions based on the user provided natural language description. Such a mechanism allows the system to better gauge the users' intents of the custom acoustic event detectors they wish to build by collecting more detailed and fine-grained natural language descriptions without hurting the user experience. The user-provided descriptions can be used to reduce domain-mismatch between the text data extracted from public sources and the user-provided descriptions.

As shown in FIGS. 1A-1D, the system 100 may include one or more user devices 110 in communication with one or more system component(s) 120 over a network(s) 199. The system 100 may also include one or more notification system components(s) 121 in communication with the user devices 110 and/or the system component(s) 120. A user device 110a may be local to a user 105. A user device 110b may be within an environment (e.g., home, office, vehicle, etc.) of the user 105. In some cases, operations attributed to the user device 110a or the user device 110b may be performed by the other device or both devices. The network(s) 199 may include the Internet and/or any other wide- or local-area network, and may include wired, wireless, and/or cellular network hardware.

Referring to FIG. 1A, the user 105 may provide one or more inputs via the user device 110a. The input(s) may indicate that the user 105 wants the system component(s) 120 to detect a custom acoustic event. Such input(s) may be provided via a companion application installed at the user device 110a, and may be in various forms, for example, typed/text input, selection of graphical user interface elements (for example, elements representing language choices potentially describing an acoustic event), voice input, etc. The input(s) may include a natural language description for the custom acoustic event. For example, the natural language description may be "dog barking" or "fridge door alarm." The user device 110a may send (step 1), to the system component(s) 120, data representative of the natural language description for the custom acoustic event. The data may be text data, token data or other natural language representation data.

The system component(s) 120 may include an acoustic event enrollment component 135 configured to facilitate enrollment for custom acoustic events detection. In some embodiments, the acoustic event enrollment component 135 may process the data (received in step 1), for example, determine texting embedding data corresponding to the natural language description. The acoustic event enrollment component 135 may send (step 2) the data or the text embedding data corresponding to the natural language description to a description refinement component 140.

The system component(s) 120 include the description refinement component 140 configured to determine, in some cases, another or additional natural language description for the custom acoustic event. The description refinement component 140 may employ a rule-based engine to determine further natural language descriptions based on the user-provided natural language description. In some embodiments, the description refinement component 140 may be a conversational engine that may engage in a dialog exchange with the user 105 to determine the further natural language descriptions. The dialog exchange may involve a speech-based exchange, where the user 105 may provide voice inputs and the user device 110a may output audio representing synthesized speech. In other cases, the dialog exchange may involve a visual-based exchange, where the user 105 may provide inputs (e.g., text, selection of GUI elements, etc.) and the user device 110a may display text, graphics, icons, etc.

The description refinement component 140 enables collection of more detailed and fine-grained descriptions of a custom acoustic event by presenting options for further descriptions or asking questions regarding the initial description. For example, if the user-provided initial natural language description for a custom acoustic event is "dog barking", the description refinement component 140 may present output data representing "Is the dog a puppy?" or "Is it a puppy?" In response, the user 105 may provide an input (e.g., via touch selection, voice input, gesture, etc.) indicating "yes" or "no." As a further example, the description refinement component 140 may present output data representing "What is dog breed?" or "What kind of dog is it?" In response, the user 105 may provide an input indicating the breed/kind of dog. The responsive user inputs may be used to determine further or another natural language description for the custom acoustic event. For example, the description refinement component 140 may determine the natural language description of the custom acoustic event to be "[dog breed] puppy barking," based on the responsive user inputs.

In another example, if the user-provided initial natural language description for a custom acoustic event is "fridge door alarm", the description refinement component 140 may present output data representing "What is the fridge's brand?" In response, the user 105 may provide an input indicating the brand. The description refinement component 140 may determine the natural language description of the custom acoustic event to be "[brand] fridge door alarm," based on the responsive user inputs.

In some cases, the description refinement component 140 may not be able to determine a close match for the user-provided initial natural language description. For example, the user may request a custom acoustic event for a "microwave beep." If the description refinement component 140 cannot determine a match for the natural language description that meets a certain confidence (e.g., similarity) threshold with existing event profiles, the system may initiate a dialog with the user to determine if any related event profiles may be similar. The description refinement component 140 identify one or more event profiles having a text embedding (or word embedding) that bears some similarity to the text embedding of the natural language description. For example, the description refinement component 140 may identify event profiles such as "fan," "alarm," and/or "appliance beep." The description refinement component 140 may output sounds corresponding to the identified event profiles and ask the user if the sounds are similar to the desired custom event sound. Based on user responses, the description refinement component 140 may generate a new custom event profile based on the user-provided natural language description and an audio embedding based on the sounds that the user indicates are similar to the desired custom event sound.

The description refinement component 140 may use a rule-based engine to determine the questions to present or type of information to request from the user 105 based on the initial natural language description provided by the user 105. In other embodiments, the description refinement component 140 may determine the questions or type of information based on data stored at an acoustic event detection (ABD) knowledge graph storage 145.

The AED knowledge graph storage 145 may store AED text graph data 175 (shown in FIG. 1C) representing multiple text embedding data (or word embedding data) corresponding to natural language descriptions of various different acoustic events. The AED text graph data 175 may cluster text embedding data based on semantic similarities. For example, text embedding data corresponding to "puppy barking" may be located close to text embedding data corresponding to "dog barking." Further details on the data stored at the AED knowledge graph storage 145 are described below in relation to FIG. 1C.

The description refinement component 140 may determine first text embedding data corresponding to the initial natural language description (e.g., "dog barking") provided by the user 105. Then the description refinement component 140 may retrieve (step 3), from the AED knowledge graph storage 145, at least second text embedding data that is semantically similar to the first text embedding data. The retrieved second (or more) text embedding data may correspond to a natural language description (e.g., "puppy barking", "female dog barking", "male dog barking", "[breed] dog barking", etc.). Using at least the second text embedding data, the description refinement component 140 may determine a question or other form of output to present to the user 105. The output may be in the form of text data (or other type of data) and may represent a natural language output. In some embodiments, the description refinement component 140 may use natural language generation (NLG) techniques (implemented within the component 140 or as a separate component) to determine the natural language output. The description refinement component 140 may send (step 4) the output to the acoustic event enrollment component 135.

In some embodiments, the acoustic event enrollment component 135 may process the output received from the description refinement component 140 to present to the user 105 as displayed output or synthesized speech. For example, the acoustic event enrollment component 135 may send the output to a text-to-speech (TTS) component (for example included in the system component(s) 120 and configured to process in a similar manner as a TTS component 480) to generate audio data representing synthesized speech. The acoustic event enrollment component 135 may send (step 5), to the user device 110*a*, output data (e.g., text data, audio data, etc.) to present to the user 105, where the output data is based on the output received from the description refinement component 140. Presenting of the output may cause the user device 110*a* to present a question or request for information, for example, "Is it a puppy?", "What is the dog breed?", "What is the fridge brand?", "Does it sound like a fan?", "Does it sound like an alarm?", "Is it similar to an appliance beep?", etc.

In response to the output data, the user 105 may provide a user input via the user device 110*a*, which may represent an answer to the question or provide the requested information. The user device 110*a* may send (step 6), to the acoustic event enrollment component 135, input data corresponding to the user input. For example, the user may say "Yes," or "Yes it is/does." if the presented output corresponds to the custom event. If the sound does not correspond to the custom event, however, the user may reply "No." "No it is/does not." or the like. The acoustic event enrollment component 135, in turn, may send (step 7) the input data to the description refinement component 140.

The description refinement component 140 may determine, based on any additional text embedding data retrieved from the AED knowledge graph 145 (in step 3), whether additional information is needed to further refine the natural language description for the custom acoustic event. If additional information is needed, the description refinement component 140 may cause additional questions or requests for information to be presented in a similar manner as described above in relation to steps 4 and 5. As described below in relation to FIG. 1C, one node/natural language description may be connected to one or more nodes/other natural language descriptions in the AED text graph data 175. For example, a node representing "dog sound" may be connected to nodes representing "dog bark", "dog snort", "dog whine", etc. The "dog bark" node may be connected to further nodes representing "puppy bark", "[first breed] dog bark", etc. In some cases, the description refinement component 140 may not identify any connected notes; but rather may identify one or more related nodes (e.g., notes that may be close to the text embedding of the natural language description). For example, if the description refinement component 140 cannot identify a node corresponding to "microwave beep," it may identify "fan", "alarm", or "appliance beep" from the AED knowledge graph 145. Based on these connected and/or related nodes, which may be retrieved from the AED knowledge graph 145, the description refinement component 140 may determine whether additional information is needed, and determine the type of questions to elicit the additional information. The description refinement component 140 may receive additional information (in a similar manner as described in relation to step 6) related to the natural language description of the custom acoustic event.

Using the user input(s) responsive to the questions or requests presented at the user device 110*a* and the initial natural language description provided by the user 105, the description refinement component 140 may determine a natural language description for the custom acoustic event that the user 105 wants the system component(s) 120 to detect. The description refinement component 140 may send (step 8), to an acoustic event profile component 150, text data 142 (or text embedding data) representing the determined natural language description for the custom acoustic event. For example, the text data 142 may correspond to "[breed] puppy dog barking", "[brand] fridge door alarm", "microwave beep", etc.

The acoustic event profile component 150 may be configured to determine acoustic event profile data to be used to ultimately detect occurrence of the custom acoustic event. Based on the received natural language description, the acoustic event profile component 150 may retrieve (step 9), from the AED knowledge graph storage 145, audio data 147 corresponding to the text data 142. The audio data 147 may be determined from public sources or other sources, and may be an audio sample of an acoustic event associated with the natural language description represented in the text data 142. The audio data 147 may not be captured from the user 105 environment by the device(s) 110 associated with the user 105. The audio data 147 may be audio embedding data. In addition to the AED text graph data 175, the AED knowledge graph storage 145 may store also AED audio graph data 165 (shown in FIG. 1C) representing multiple audio embedding data corresponding to various different acoustic events. The AED knowledge graph storage 145 may further store data associating individual audio embedding data to corresponding text embedding data describing the respective acoustic event. For example, text embedding data corresponding to "dog barking" may be associated with audio embedding data corresponding to audio representing a dog bark. Further details on the data stored at the AED knowledge graph storage 145 are described below in relation to FIG. 1C.

The acoustic event profile component 150 may store (step 10) the custom event profile including the audio data 147 in a custom AED profile storage 155. The custom event profile may also include a natural language description associated with audio data 147, for example, the text data 142. The custom event profile may include other data and/or metadata; for example, threshold confidence and/or similarity data, which may indicate how similar a detected sound may be to the audio data 147 to trigger an event notification. Such threshold data may be adjusted as system knowledge of the custom event profile is refined through, for example, user feedback based on detected events played back for the user. Additionally, the audio data 147 may be associated with a user profile identifier associated with the user 105. In this manner, the system component(s) 120 can determine audio data (from stored data) corresponding to a custom acoustic event based on a natural language description of the custom acoustic event.

FIG. 1B illustrates another implementation of a system configured to receive and process a request to detect a custom acoustic event, according to embodiments of the present disclosure. In some implementations, the functions of the system 100 may be performed by the user device 110; for example, without sending audio data to other systems/devices including ones not under the control of the user 105. In the example implementation shown in FIG. 1B, the operations 1 through 10 described above with reference to FIG. 1A may be performed a user device 110 such as the speech-controlled device with display 110f. The user device 110 may include other components such as an event notification component that can alert the user (either via the same user device 110 and/or a different user device 110 such as a smart phone 110b). The user device 110 may have additional components for audio and/or speech processing as described below with reference to FIG. 4.

FIG. 1C is a conceptual diagram illustrating multi-view model training to align audio and text representation networks, with aligned concept space map to hierarchical knowledge graph, according to embodiments of the present disclosure. FIG. 1C illustrates how graph data, that may be stored at the AED knowledge graph storage 145, may be generated. A text graph generator 170 may generate AED text graph data 175 by processing text data 172. The AED text graph data 175 may represent relationships between various natural language descriptions for acoustic events based on the semantic meanings of the natural language descriptions. An audio graph generator 160 may generate AED audio graph data 165 by processing audio data 162. The AED audio graph data 165 may represent relationships between various audio data based on similarities in their corresponding acoustic features. The system 100 may further include a mapping model 180 to generate mappings between the text data represented in the AED text graph data 175 and the audio data represented in the AED audio graph data 165. Embedding vectors corresponding to encoded text and audio may be combined with similarity threshold data 185 to form a custom acoustic event profile.

In some implementations, the audio graph generator 160 may be an audio representation network, such as a computer model configured to encode audio frames/spectrograms into an audio embedding space. The audio graph generator 160 may include, for example, a neural network encoder such as the convolutional recurrent neural network (CRNN) 560 shown in FIG. 5. The audio graph generator 160 may be an encoder that generates an audio embedding using normalized feature data from the audio data 162. The audio graph generator 160 may include one or more convolutional layers followed by one or more recurrent layer(s) that may process the normalized audio data to generate vector corresponding to the audio data. The audio graph generator 160 may be pre-trained to generate audio embeddings that represent acoustic qualities of the audio da such that, for example, similar sounds may have similar vectors as determined by a mathematical function such as vector distance or cosine similarity.

As described herein, one graph, AED text graph data 175, may integrate and represent relationships between natural language descriptions, which may be based on text embeddings or word embeddings. The AED text graph data 175 may be generated using text data 172. The text data 172 may be determined from public sources, such as the Internet, and/or more inputs provided by various users. In some embodiments, the text data 172 relates to acoustic events, and may not describe non-acoustic events. For example, the text data 172 may represent "dog barking", "fridge door alarm", "cat meow", etc. In other embodiments, the text data 172 may encompass various descriptions or words, and a text graph generator 170 may process the text data 172 to determine a subset of text data relating to acoustic events only. The text graph generator 170 may use part-of-speech (POS) tagging, named entity recognition (NER), and/or other techniques to determine text data relating to acoustic events. The text data 172 may also refer to token data, sub-words, etc.

In some embodiments, the text graph generator 170 may be a text representation network, such as a computer model configured to encode text/words into a semantic space. In some implementations, the text graph generator 170 may include one or more neural networks that may process a corpus of text to learn word associations (e.g., using a word2vec or similar technique). So trained, the text graph generator 170 may represent a word with a list of numbers (e.g., a vector). The vector may represent a semantic embedding corresponding to the word that reflects the semantic and/or syntactic quality of the word. Thus, vectors that are close in the semantic space of the model may represent words that have similar meaning/use. A mathematical function (such as cosine similarity) may indicate a level of semantic similarity between two words represented by those vectors. In practice, when the description refinement component 140 cannot find a node in the AED knowledge graph 145 corresponding to the natural language description of "microwave beep", it may use the AED text graph data 175 to determine that vectors representing "appliance" and "alarm" are somewhat similar to the words in the natural language description.

In some embodiments, an example set of text relating to acoustic events may be used to determine further text data 172 relating to acoustic events from public sources. For example, starting with the example text "speech", the system may identify a public website that describes "speech", and then use POS tagging and/or NER based methods to extract words/entities related to "speech" from the website. For example, text such as "human vocal communication", "language", "lexicon of a language", "vocalization", etc. may be extracted from the website. The system may use one or more gating mechanisms that select the text that have high semantic similarities with the example text. In this manner, acoustic event-specific text data is extracted from public sources to maximize the richness of the text, evaluated by the text graph generator 170, while not including many irrelevant texts. The text graph generator 170 may use the determined words/entities as new nodes for the AED text graph data 175 when they are determined to be acoustic event relevant. The text corpus, for the AED text graph data 175, may be expanded by following related web pages, NER of existing text data/web pages, etc. as one acoustic event description can lead to discovery of multiple others during the search of relevant text data on the Internet.

Additionally, in some embodiments, user inputs may be used to contribute to the text corpus used to generate the AED text graph data 175, For example, a user may provide natural language descriptions of various different acoustic events through spoken inputs, using a companion application of the system component(s) 120, etc. Such user inputs may be anonymized and may not be associated with a user identifier, a device identifier, or other identifying information. Additionally, in some embodiments, user inputs provided when configuring the system component(s) 120 to detect custom acoustic events (e.g., natural language descriptions provided as described above in relation to FIG. 1A) may be used to generate the AED text graph data 175.

The determined AED-specific text corpus (e.g., the text data 172) may be used to fine-tune one or more generic text embedding models such that the structural relationships of different acoustic events are preserved. The fine-tuned text embedding model may then be used to encode the determined text data 172 into semantic representations, which may be vector data with a fixed dimension. The encoded text data may be used to build the vertices of the AED text graph data 175, which may reflect the high-level relationship between different acoustic events. In some embodiments, a vertex between acoustic event A and acoustic event B is determined to be valid by measuring the distance between the vector data/semantic representations of A and B (e.g., Euclidean distance of the two vectors) against a condition (e.g., a dynamic threshold) for similarity measure.

The text graph generator 170 may determine text embeddings for a natural language description for an acoustic event. In some embodiments, a word2vec technique may be used (that generates a 300 dimensional vector representation), and when the natural language description includes multiple words, an average of the vectors for the individual words may be used as the text embedding for the description. In other embodiments, the text graph generator 170 may employ a universal sentence encoder (e.g., that generates a 512 dimensional vector). In yet other embodiments, the text graph generator 170 may employ a tokenizer to identify words that are nouns, verbs or adjectives from the text corpus, and select words with high cosine similarities with respect to the corresponding labels using their vector representations. Then the average of the vector representations of the selected words weighted by their occurrences in the text corpus. This POS tagging-based word selection method makes the text embedding invariant to the order of concatenation of texts from various sources or multiple web pages. The text embeddings may be referred to as word embeddings, in some cases, and may correspond to subwords, token data, etc.

In some embodiments, the audio data 162 relates to acoustic events and may have natural language descriptions that are included in the text data 172. The mapping model 180 is trained using labeled mappings between a portion of the audio data 162 and a portion of the text data 172. Not all of the descriptions represented in the text data 172 may have corresponding audio data, and not all of the audio data 162 may have a corresponding description. The mapping model 180 may process the AED text graph data 175 and the AED audio graph data 165 to determine bi-linear mappings between text embeddings that do not have a mapping to an audio embedding.

In some embodiments, the audio embeddings may be extracted from log mel spectrogram features of the audio data 162. In some embodiments, the mapping model 180 may use a dense layer (e.g., a 527-unit dense layer) with a sigmoid activation along with an audio encoder may be used to extract audio embeddings corresponding to the audio data 162. The mapping model 180 may be configured using a two-view alignment loss between text embeddings and audio embeddings as a regularizer to the supervised loss. In some embodiments, cosine similarity may be enforced for the multi-view alignment. In other embodiments, linear canonical correlation analysis loss may be used. An example overall loss equation is shown below, where a hyper-parameter a to adjust the relative importance of the supervised cross-entropy loss $L_{sup}$ and the embedding alignment loss $L_{coms}$:

$$L = \frac{E}{i}\left\{L_{sup}(\hat{y}_i, y_i) + \alpha \frac{1_{r \in Eve(i)} L_{cons}(E_i, Me'_i)}{\sum_r 1_{r \in Eve(i)}}\right\} \quad (1)$$

$$L_{sup} = y_i^T \cdot \log(\hat{y}_i) + (1 - y_i^T) \cdot \log(1 - \hat{y}_i) \quad (2)$$

$$L_{cons} = \frac{E_i \cdot Me'_r}{\|E_i\| \cdot \|Me'_r\|} \quad (3)$$

In equation (1) above, Eve(i) is the set of events present in audio i. The label description is $y_i$, the predicted description is $\hat{y}_i$, the audio embedding is $E_i$ and the text embedding is $e_i$. M is a matrix used to map the text embeddings into the same shape/space as the audio embeddings, which is shared across all the acoustic events. In equation (1) one acoustic event (amongst all events present in the label) is chosen at random (denoted as r in equations (1) and (3)) and use its text embeddings to calculate $L_{cons}$. As the number of epochs becomes sufficiently large, the stochastic implementation approximately converges to equation (1). The supervised loss $L_{sup}$ is updated regularly with all events present in each sample.

After the mapping model 180 is trained, it may be used to process audio data 162 that does not have a bi-linear mapping. At inference time, the mapping model 180 may process first audio data 162 to determine first text data 172 that represents a natural language description of the first audio data 162. The bi-linear mappings between the audio data 162 and the text data 172 may be stored at the AED knowledge graph storage 145. In some embodiments, the bi-linear mappings may be stored as data representing an association/correspondence between an audio embedding and a text embedding.

The stored bi-linear mappings can then be used to determine audio data corresponding to a user-provided natural language description for a custom acoustic event, as described in relation to FIG. 1A. That is, the system component(s) 120 may determine a natural language description (e.g., as provided by the user 105 or a refined version of the user-provided description), determine a text embedding corresponding to the natural language description, and determine a first node in the AED text graph data 175 that is semantically similar to the text embedding. Using the bi-linear mappings, the system component(s) 120 may determine a second node in the AED audio graph data 165 that is associated with the first node in the AED text graph data 175, and may use the audio data/audio embedding (e.g., the audio data 147) corresponding to the second node as a potential sample of the custom acoustic event described by the user 105.

When a user-provided natural language description is determined to be a novel node that is not already represented in the AED text graph data 175 (e.g., a user says "Alexa, I want to build a custom sound detector for my puppy dog whimper,"), the system determines an estimated degree of the node to determine how to insert the novel node into the AED text graph data 175. For example, "animal" may be a 'super-category' with the highest degree, "dog sound" and "cat sound" may be its 'sub-categories' that branch into multiple children nodes, and "dog bark" and "cat hiss" may be 'leaf nodes' which do not have children nodes. When a super-category is discovered, then some clusters may be broken up into smaller sub-graphs in order to fit in a new concept. On the other hand, when a leaf node is discovered, it is appended to end of an appropriate branch.

The AED text graph data 175 can be used to provide reference semantics in a "text view" to support various audio tasks when limited or no audio samples are available. For example, concept clusters can be built in both audio and text views. As text data is more readily available (from public sources), the concept clusters may be denser and more accurate in the text view than in the audio view. Using existing audio and text pairs, the mapping model 180 may be trained to determine a bi-linear mapping between the two views. Therefore, when expanding to a new acoustic event, the text representation and the learned bi-linear mapping can be used to estimate its audio representation. For acoustic events that share common "low-level" acoustic features, for example, "cat sound" and "dog sound" are both produced through the same biological pathway (i.e. lung→vocal fold→oral cavity→lips) and their sounds share similar sound production mechanism, the mapping model 180 can generalize well in generating the bi-linear mappings.

In some cases, the AED text graph data 175 can be used for making manual annotations for custom acoustic events more efficient. Because the AED text graph data 175 has a top-down structure, where a sub-graph or cluster embodies the concept of a "super-category" and the leaf nodes represent the more fine-grained description to summarize the target acoustic event, this can be leveraged this to help the manual annotators make faster decisions, With the AED text graph data 175 and the bi-linear map, a few plausible annotation paths can be predicted to assist the annotators to find the best descriptions for acoustic events present in an audio clip. Given a pair of audio embedding and text description, the system can propose top N paths for plausible events based on the likelihoods in a top-down order (super-category→sub-category→leaf node). For example, if an audio contains "dog cry", the system may propose the following few paths:
   animal sound→domestic pets→dog sound→dog bark→dog cry→puppy dog cry;
   animal sound→domestic pets→dog sound→dog bark→dog whimper→multiple dog whimper→multiple dog whimper and bark;
   animal sound→domestic pets→cat sound→cat meow→cat meow and hiss.

The AED text graph data 175 may be updated based on user inputs provided by multiple users. For example, the AED text graph data 175 may be updated to include natural language descriptions provided by the user 105 that are not already represented in the AED text graph data 175. The AED audio graph data 165 may be updated based on event audio (e.g., the event audio 113) that occurred in multiple user environments. For example, the AED audio graph data 165 may be updated to include audio embeddings that are not already represented in the AED audio graph data 165. The updated AED graph data may be used to process subsequently received user inputs requesting configuration of custom acoustic event detection. For example, a first user may provide a natural language description for a sound made by a particular brand of appliance, and the system component(s) 120 may capture event audio representing the sound made by the particular brand of appliance. The natural language description and the event audio may be integrated in the respective AED graph data 165, so that when a second user requests detection of the sound made by the particular brand of appliance, the system component(s) 120 can retrieve audio embedding data corresponding to the previously received event audio, and use the audio embedding data to detect occurrence of the sound made by the particular brand of appliance in the second user's environment.

FIG. 1D is a conceptual diagram illustrating an aligned concept space 190 representing mappings between the text data represented in the AED text graph data 175 and the audio data represented in the AED audio graph data 165, according to embodiments of the present disclosure. FIG. 1D shows a concept structure for aligned mappings between text embeddings and audio embeddings. For example, while "dog toy" and "cat toy" correspond to different animals, they may share acoustic and conceptual similarities as reflected by the node linking them. In another example, although bird squawks and human speech may be fairly different, in some contexts they may relate to a certain degree (e.g., birds trained to say words, a flock of geese sounding like a human conversation, etc.).

FIG. 2A illustrates the system 100 configured to update acoustic event profile data based on user feedback to detect the custom acoustic event, according to embodiments of the present disclosure. In some embodiments, the user 105 may enroll in an AED service via the companion application for the AED system(s). In enrolling in the AED service, the user 105 may provide authorization or permission for one or more user devices 110, associated with a user profile of the user 105, to monitor and capture non-speech audio occurring proximate to the user devices 110. FIG. 2A illustrates how the system component(s) 120 may determine acoustic event profile data to detect the custom acoustic event.

The user device 110b may capture event audio 107 from an event 106 that may occur within an environment of the user device 110a, where the environment may be an area surrounding the user device 110a, and the user device 110a is capable of "hearing"/capturing sounds occurring within the environment. The user device 110a may determine that the event audio 107 is non-speech audio, and may send (step 11) event audio data 152, corresponding to the event audio 107, to the system component(s) 120. The system component(s) 120 may process the event audio data 152 using the acoustic event profile component 150.

The acoustic event profile component 150 may retrieve (step 12) the audio data 147 from the custom AED profile storage 155. The acoustic event profile component 150 may determine a user profile identifier associated with the user device 110b, and may use the user profile identifier to retrieve the audio data 147. In some cases, the acoustic event profile component 150 may retrieve multiple different audio data, associated with the user profile identifier, from the custom AED profile storage 155.

The acoustic event profile component 150 may process the event audio data 152 (or corresponding audio embedding data) with respect to the audio data 147 (or corresponding audio embedding data) to determine similarity data representing a similarity between the event audio data 152 and the audio data 147. The acoustic event profile component 150 may determine the similarity data using various techniques, for example, using a cosine similarity, using a number of overlapping data points within a feature space, using a distance between data points within a feature space, etc. The acoustic event profile component 150 may determine that the event audio data 152 corresponds the same or similar acoustic event represented by the audio data 147 when the similarity data satisfies a condition (e.g., a threshold similarity value). The similarity data may include one or more numerical values or a vector of values, and the condition may be represented as single numerical value, in which case an average of the values in the similarity data may be used to determine whether the condition is satisfied. In determining that the event audio data 152 corresponds to the audio data 147, the acoustic event profile component 150 may determine that the event audio data 152 represents a sample of the custom acoustic event, corresponding to the audio data 147, that the user 105 wants the system 100 to detect.

The acoustic event profile component 150 may send (step 13) the event audio data 152 to the acoustic event enrollment component 135. The acoustic event enrollment component 135 may send (step 14) the event audio data 152 to the user device 110a for presenting to the user 105. Along with the event audio data 152, the acoustic event enrollment component 135 may also send output data requesting a user input indicating whether or not the event audio data 152 corresponds to the custom acoustic event that the user 105 wants the system component(s) 120 to detect. The output data may also include a natural language description of the custom acoustic event represented in the audio data 147. The output data may be synthesized speech or displayed output. For example, the acoustic event enrollment component 135 may cause the user device 110a to output the event audio data 152 and display text "Is this the [breed] puppy barking?" As another example, the user device 110a may output the event audio data 152 and display text "Is this the [brand] fridge door alarm?" In some embodiments, the output data and the event audio data 152 may be presented by the companion application of the system component(s) 120. The companion application may output a notification at the user device 110a indicating that there is a message or action requiring the user's attention. The user 105 may open the notification, in response to which, the output data and the event audio data 152 may be presented.

The user 105 may provide one or more inputs, via the user device 110a, in response to the output data and the event audio data 152. The user input(s) may be speech, selection of GUI elements, entry of text, gesture, etc. For example, the user input(s) may be an affirmative input indicating that the event audio data 152 is a sample of the custom acoustic event. As another example, the user input(s) may be a negative input indicating that the event audio data 152 is not a sample of the custom acoustic event. The user device 110a may send (step 15) input data corresponding to the user input(s) to the acoustic event enrollment component 135.

In some embodiments, the acoustic event enrollment component 135 may send (at the step 14) multiple different event audio data that may be determined to be samples of the custom acoustic event represented in the audio data 147. The system component(s) 120 may receive multiple event audios corresponding to multiple different events that near one or more of the user devices 110 associated with the user profile identifier for the user 105. In such cases, the acoustic event enrollment component 135 may present output data requesting a user input with respect to the each individual event audio data. For example, the acoustic event enrollment component 135 may display text "Is this the [breed] puppy barking?" and output first event audio data. After receiving a user input with respect to the first event audio data, the acoustic event enrollment component 135 may display text "How about this?" or "Is this also the [breed] puppy barking?" and output second event audio data. In some embodiments, the user device 110a may send separate input data for the separate user input(s) relating to each individual event audio data presented to the user 105. In other embodiments, the user device 110a may send input data corresponding to the cumulative user inputs provided by the user 105 relating to all of the event audio data presented to the user 105.

The acoustic event enrollment component 135 may send (step 16) the input data, received from the user device 110a, to the acoustic event profile component 150. Based on an affirmative response represented in the input data, the acoustic event profile component 150 may use the event audio data 152 to determine acoustic event profile data 157 for the custom acoustic event. Based on a negative response represented in the input data, the acoustic event profile component 150 may not use the event audio data 152 to determine the acoustic event profile data 157 for the custom acoustic event. In some embodiments, the acoustic event profile component 150 may determine audio embedding data (or encoded representation) corresponding to the event audio data 152, and store as the acoustic event profile data 157. Details on how the acoustic event profile component 150 may determine the acoustic event profile data 157 are described below in relation to FIG. 6. In cases where multiple instances of event audio data is affirmed by the user 105 as representing the custom acoustic event, the acoustic event profile component 150 may aggregate the event audio data or aggregate audio embedding data (or encoded representations) corresponding to the individual event audio data, and store the aggregated data as the acoustic event profile data 157.

The acoustic event profile component 150 may store (step 17) the acoustic event profile data 157 in the custom AED profile storage 155. The acoustic event profile data 157 may be associated with a natural language description for the custom acoustic event, for example, the text data 142. Additionally, the acoustic event profile data 157 may be associated with the user profile identifier associated with the user 105. In some embodiments, the acoustic event profile data 157 may be stored in addition to the audio data 147 in the custom AED profile storage 155. In other embodiments, the acoustic event profile data 157 may be stored instead of or may replace the audio data 147 in custom AED profile storage 155. In yet other embodiments, the acoustic event profile component 150 may determine the acoustic event profile data 157 using the event audio data 152 and the audio data 147. In this manner, the system component(s) 120 may determine the acoustic event profile data 157 by detecting acoustic events that occur within the user's environment and determining such acoustic events potentially correspond to the custom acoustic event.

Figure 2B:
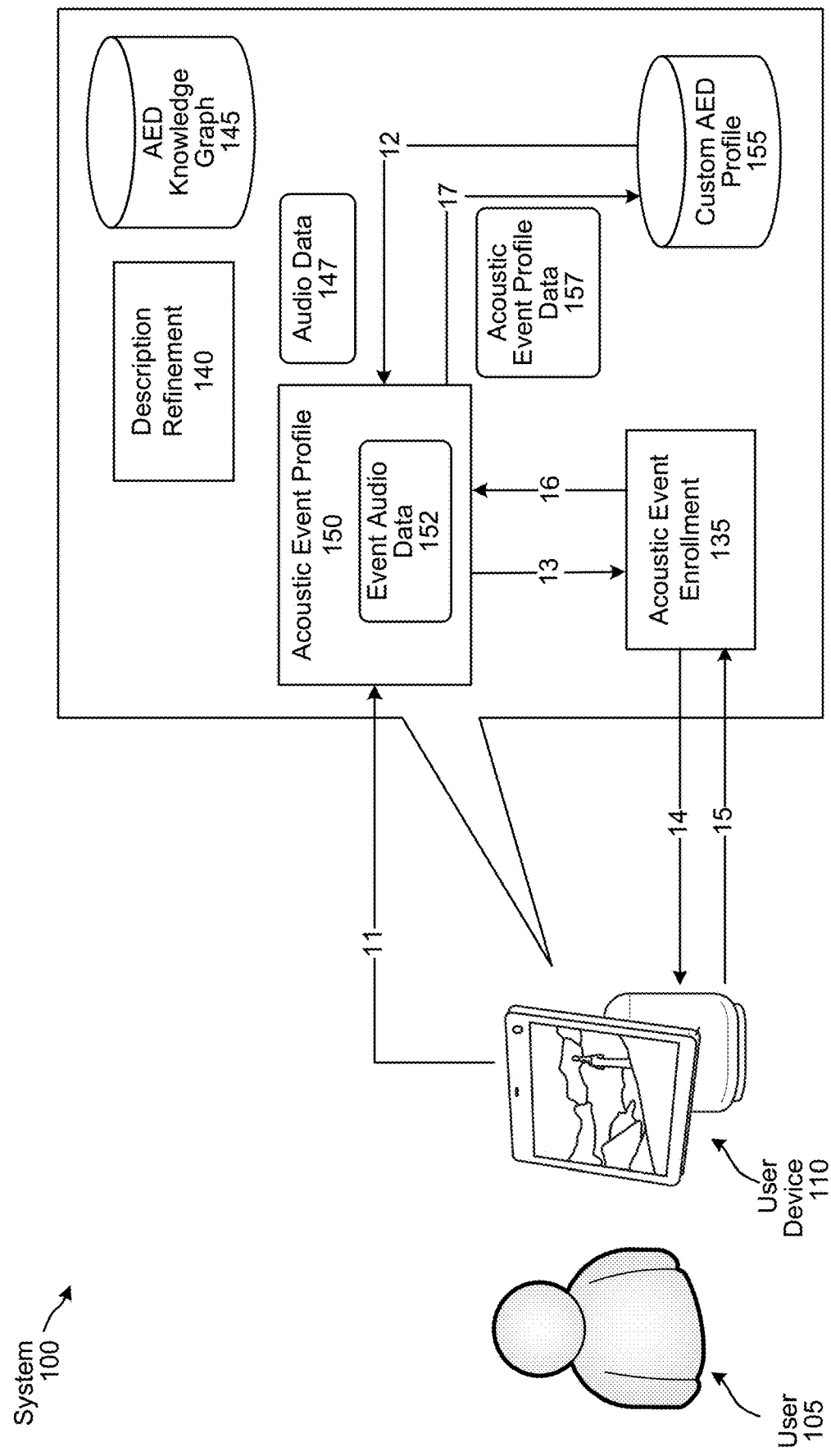
FIG. 2B illustrates another implementation of the system configured to update acoustic event profile data based on user feedback, according to embodiments of the present disclosure.

FIG. 2B illustrates another implementation of the system configured to update acoustic event profile data based on user feedback, according to embodiments of the present disclosure. In some implementations, the functions of the system 100 may be performed by the user device 110; for example, without sending audio data to other systems/devices including ones not under the control of the user 105. In the example implementation shown in FIG. 2B, the operations 11 through 17 described above with reference to FIG. 2A (as well as the operations 18 through 20 described below with reference to FIG. 2D) may be performed a user device 110 such as the speech-controlled device with display 110f. The user device 110 may include other components such as an event notification component that can alert the user (either via the same user device 110 and/or a different user device 110 such as a smart phone 110b). The user device 110 may have additional components for audio and/or speech processing as described below with reference to FIG. 4. In some implementations, the user device 110 may send event notification data to the notification system(s) 121. In some implementations, the user device 110 may handle notifications locally (e.g., by outputting notifications by the user device 110 that detected the event or by using a network connection to another user device 110 sharing the same user profile and/or configured by the user to receive such notifications).

Figure 2C:
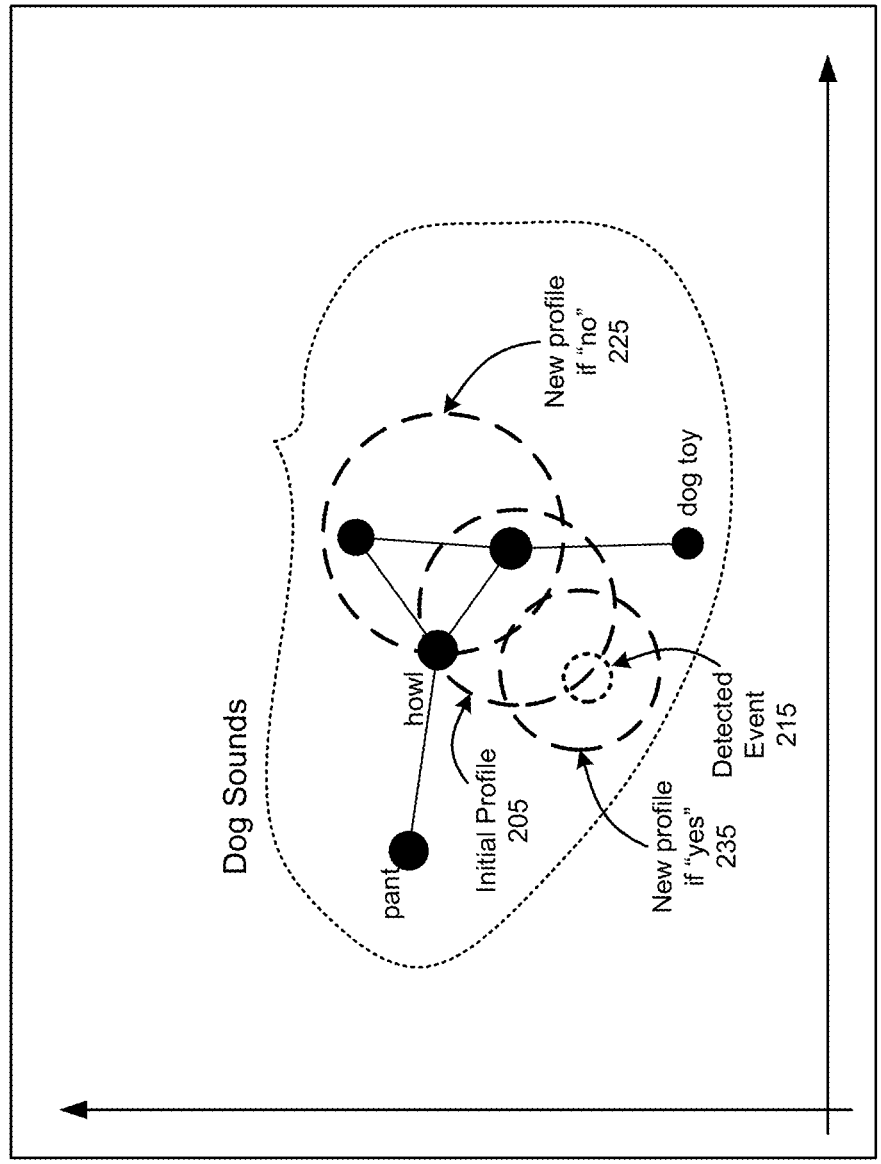
FIG. 2C is a conceptual diagram illustrating how acoustic event profile data may be updated based on a user response to playback of a detected event, according to embodiments of the present disclosure.

FIG. 2C is a conceptual diagram illustrating how acoustic event profile data may be updated based on user feedback on candidate acoustic events, according to embodiments of the present disclosure. The aligned concept space 190 includes a first circle 205 representing the initial event profile. The center of the first circle 205 may correspond to the vector representing the audio embedding, and the radius of the first circle 205 may correspond to a threshold similarity for triggering a notification.

The system 100 may detect a possible match for the custom event profile. The system 100 may determine a vector representing an acoustic embedding of the event, indicated by the dot 215 in the aligned concept space 190. Because the detected event 215 falls within the initial profile circle 205, the system 100 may store the sound corresponding to the event for playback to the user.

The system 100 may ask the user 105 if they wish to review the sound. The system 100 may play the sound for the user 105 and ask whether it matches the custom event profile. If the user 105 responds in the negative (e.g., "No" or "It does not."), the system 100 may update the custom event profile. To update the custom event profile, the system may adjust the vector representing the acoustic embedding of the custom event sound away from the detected event 215 and/or lower the similarity threshold for triggering a notification (e.g., such that the new similarity threshold represents a lesser threshold similarity than the previous similarity threshold, making the system more likely to determine a match). For example, the system 100 may calculate a gradient between the custom event vector and the detected event vector. The system 100 may calculate the updated vector for the custom event by adjusting values in a direction opposite the calculated gradients. The lower similarity threshold for triggering a notification will allow detection of events more dissimilar from the updated custom event vector. Thus, the updated custom event profile may be represented by a second circle 225, which, as shown in FIG. 2C, may have a center further away from the detected event 215 than the initial profile 205, and may have a larger radius representing the lower similarity threshold.

If the user 105 responds in the positive (e.g., "Yes" or "It does."), the system 100 may adjust the vector representing the acoustic embedding of the custom event sound toward the detected event 215 and/or raise the similarity threshold for triggering a notification (e.g., such that the new similarity threshold represents a greater threshold similarity than the previous similarity threshold, making the system less likely to determine a match). For example, the system 100 may calculate a gradient between the custom event vector and the detected event vector. The system 100 may calculate the updated vector for the custom event by adjusting values in the direction of the calculated gradients. The higher similarity threshold for triggering a notification will limit detection of events to those having greater similarity to the updated custom event vector. Thus, the updated custom event profile may be represented by a third circle 235, which may have a center closer the detected event 215 than the initial profile 205, and may have a smaller radius representing the higher similarity threshold used to determine whether to trigger a notification, FIG. 2D illustrates the system 100 configured to detect occurrence of the custom acoustic event, according to embodiments of the present disclosure. Using the acoustic event profile data 157, the system component(s) 120 may detect occurrence of the custom acoustic event using a comparison-based technique. Referring to FIG. 2D, the system component(s) 120 may include an AED component 295 configured to detect occurrence of custom acoustic events. The user device 110b (or another user device 110 associated with the user profile identifier for the user 105) may capture event audio 113 from an event 112 that may occur within an environment of the user device 110b, where the environment may be an area surrounding the user device 110b, and the user device 110b is capable of "hearing"/capturing sounds occurring within the environment. The user device 110b may send (step 18) event audio data 162 corresponding to the event audio 113 to the system component(s) 120. In some embodiments, the user device 110b may process the event audio 113 using an acoustic front end (AFE) component 324 (shown in FIG. 4) for processing. The AFE component 324 may be configured to process the event audio 113 and determine corresponding event audio data 162, which may be acoustic feature data.

The AED component 295 may retrieve (step 19) the acoustic event profile data 157 from the custom AED profile storage 155. The acoustic event profile data 157 may be retrieved based on the user profile identifier associated with the user device 110b. The AED component 295 may process the event audio data 162 with respect to the acoustic event profile data 157 to determine whether the event audio data 162 corresponds to the custom acoustic event represented in the acoustic event profile data 157. For example, the AED component 295 may determine similarity data representing a similarity between the event audio data 162 and the acoustic event profile data 157. The AED component 295 may determine the similarity data using various techniques, for example, using a cosine similarity, using a number of overlapping data points within a feature space, using a distance between data points within a feature space, etc. The AED component 295 may determine that the event audio data 162 corresponds the custom acoustic event represented by the acoustic event profile data 157 when the similarity data satisfies a condition (e.g., a threshold similarity value). The similarity data may include one or more numerical values or a vector of values, and the condition may be represented as single numerical value, in which case an average of the values in the similarity data may be used to determine whether the condition is satisfied. Further details of the AED component 295 are described below in relation to FIG. 5.

The AED component 295 may determine that the event audio data 162 represents occurrence of the custom acoustic event represented in the acoustic event profile data 157, in which case, the AED component 295 may send (step 20) detected event data to the notification system component(s) 121. The detected event data may indicate which custom acoustic event occurred. For example, the detected event data may represent the natural language description for the custom acoustic event (e.g., the text data 142).

The notification system component(s) 121 may generate notification data 756 (shown in FIG. 7) based on the detected event data. The notification system component(s) 121 may send the notification data 756 to the user device 110a (or another user device 110) associated with the user profile identifier for the user 105. Further details regarding the notification output are described below in relation to FIG. 7.

In some embodiments, one or more of the operations described above may be performed by the user device 110a, the user device 110b or another user device 110 associated with the user 105. For example, the user device 110b may include an AED component 295 that is configured to process in a similar manner as the AED component 295 to detect occurrences of custom acoustic events. In such examples, the acoustic event profile data 157 may be determined by the system component(s) 120, then provided to the user device 110b and stored at a custom AED profile storage 155 included at the user device 110b.

The system component(s) 120 may also receive other data, which may include, for example, time data, image data, sensor data from other sensors in an environment, sensor data from a sensor(s) of the device(s) 110, or the like. Such other data may be used by the AED component 295 to determine whether a custom acoustic event occurred.

In some embodiments, the components of the AED component 295 may be configured after applying quantization techniques. Quantization is the process of transforming deep learning models to use parameters and computations at a lower precision. Some quantization techniques may involve a process of approximating a neural network that uses floating-point numbers by a neural network of low bit width numbers. Such techniques may reduce both the memory requirement and computational cost of using neural networks.

In some embodiments, the AED component 295 may employ streaming models. The system/device may acquire data (e.g., audio data) sequentially over time. Rather than wait for data to be collected for the entire event 112, streaming models start processing the event audio 113 as it is received to begin identifying patterns, making decisions, etc. as the data is received.

To enhance user privacy by reducing or eliminating the need to share audio data captured by the user device 110, the system 100 may use self-supervised federated learning techniques to update various machine learning models used for acoustic event detection and/or classification. In an example operation, an encoder (e.g., an audio graph generator and/or a CRNN 560) may be trained to extract audio features from an audio signal. A decoder may be trained to predict a subsequent portion of audio data (e.g., a subsequent frame of audio data represented by LFBE). The encoder and decoder may be trained using self-supervised learning to improve the decoder's predictions and, by extension, the quality of the audio feature data generated by the encoder. The system may apply federated learning to share encoder updates across devices. The system may fine-tune the classifier to improve inferences based on the improved audio feature data. The system may distribute classifier updates to the device(s) to update an on-device classifier.

Although illustrated for updating an encoder in the context of acoustic event detection, the systems and methods described herein can be applied to encoders or other neural network components configured to extract features from various types of sequential data.

Figure 3A:
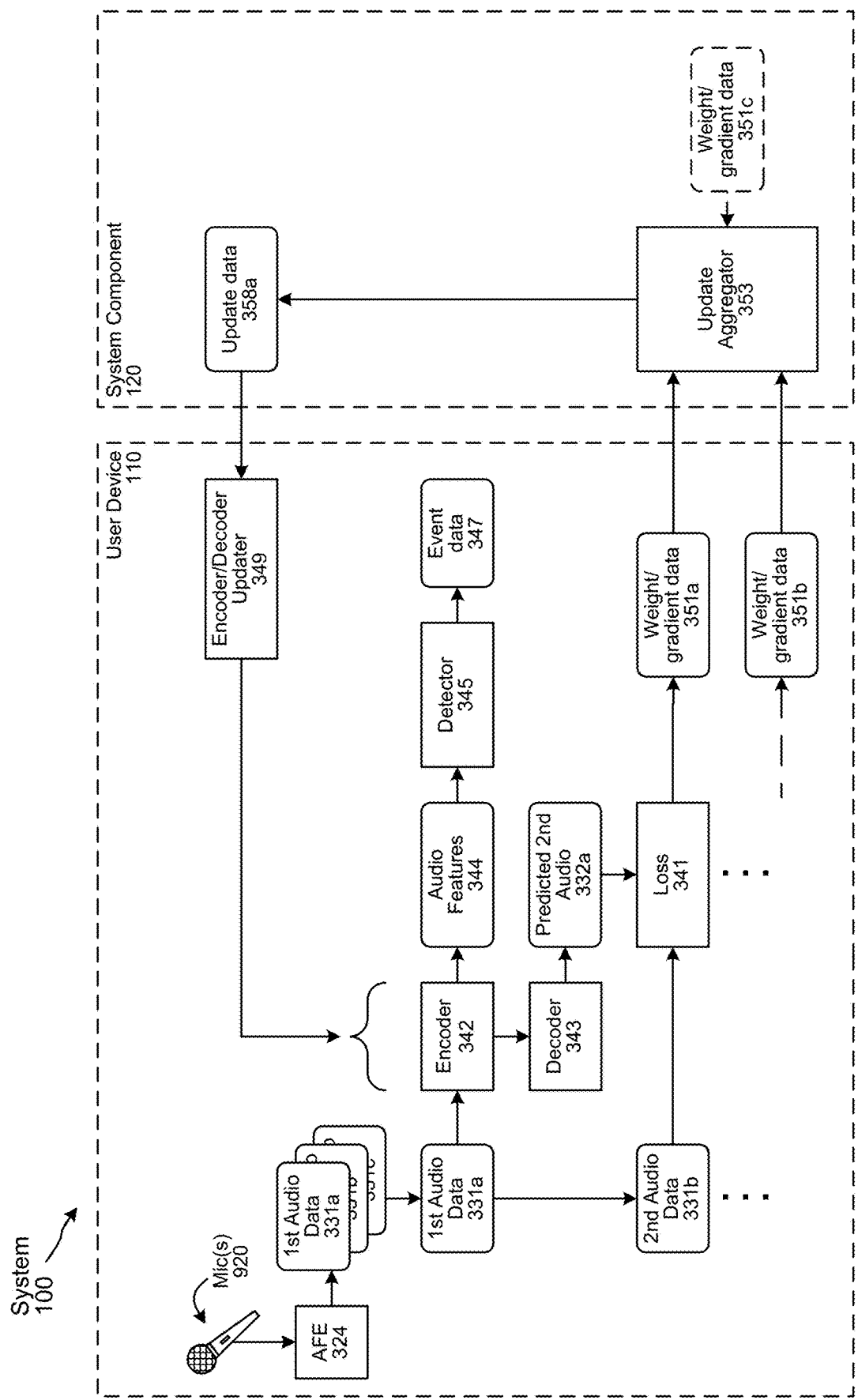
FIGS. 3A and 3B are conceptual diagrams illustrating example privacy-preserving operations for updating a cloud-based acoustic event detection model, according to embodiments of the present disclosure.
Figure 3B:
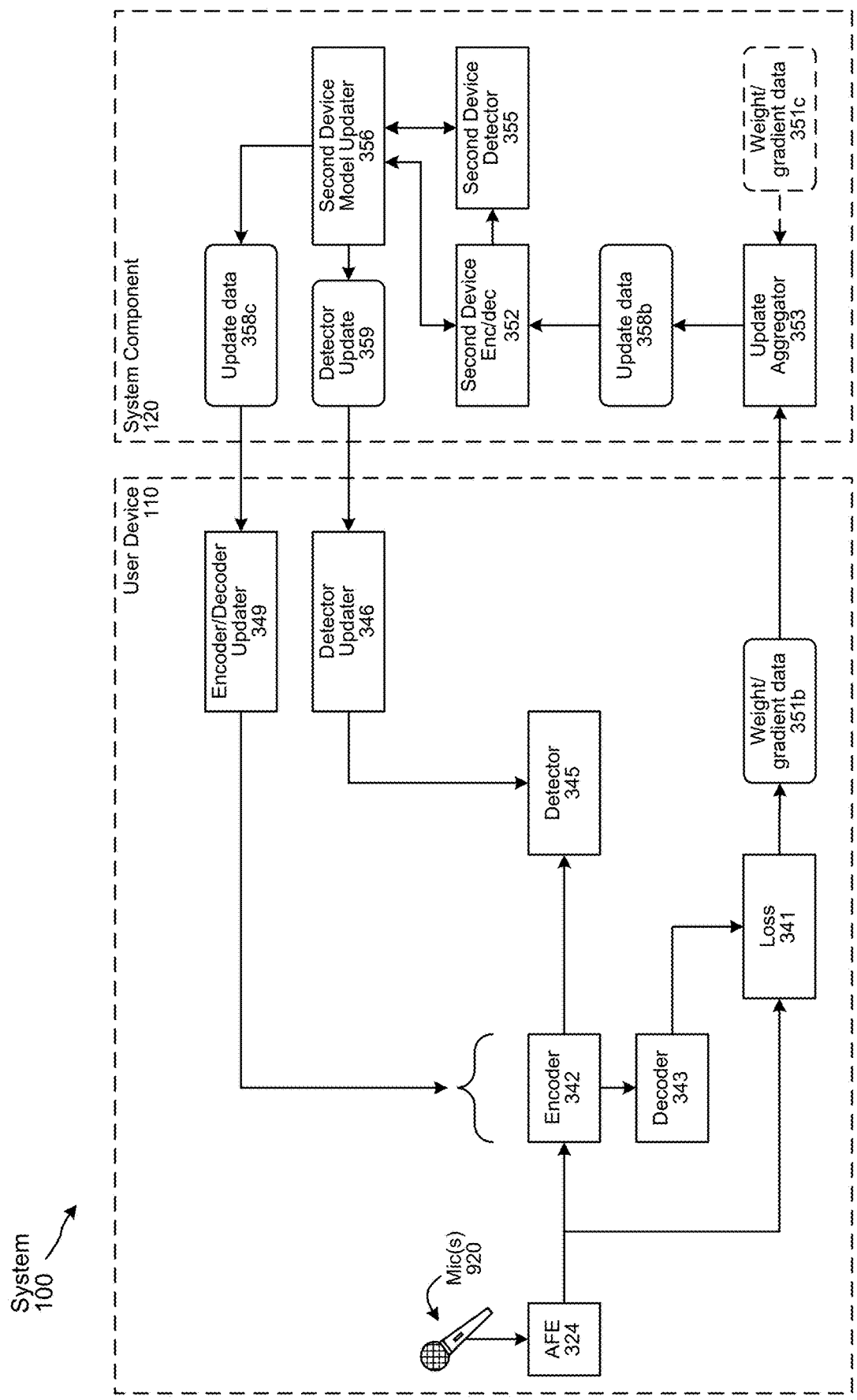

FIGS. 3A and 3B are conceptual diagrams illustrating example operations for using self-supervised federated learning to train models used for acoustic event classification, according to embodiments of the present disclosure. And FIG. 3C (described below) is a flowchart illustrating example privacy-preserving operations for updating the cloud-based acoustic event detection model, according to embodiments of the present disclosure.

The operations may be performed by a system 100, which may include at least a user device 110, such as one of the user devices 110 described with reference to FIG. 9, and a system component 120 described with reference to FIG. 10. The user device 110 and system component 120 may communicate over one or more computer networks 199. The system components 120 may in close proximity to the user device 110 (e.g., in the same room, building, complex, etc.) or may be remote from the user device 110 (e.g., in a datacenter and/or otherwise implemented "in the cloud"). In some implementations, the user device 110 and/or system component 120 may additionally communicate with one or more notification system components 121 and/or skill support system components 425, which may provide additional capabilities to the system 100, as described with reference to FIG. 4. The user device 110, system component 120, notification system component 121, and/or skill support system components 425 may include similar or different hardware and/or software. Various examples of devices/system features are described in additional detail below with reference to FIGS. 9 to 11.

The system 100 may include components for performing audio event detection (AED) and/or generating notifications to a user. An audio capture component(s), such as a microphone or array of microphones 920 of the user device 110, may capture input audio 12 and create a corresponding audio signal. An acoustic front end (AFE) 324 may process the audio signal using a number of techniques, such as determining frequency-domain audio data by using a transform such as an FFT and/or determining a Mel-cepstrum. The AFE 324 may output audio data 331, which may be or include acoustic feature data corresponding to a representation of the input audio 12. The AFE 324 may process the audio signal to create acoustic feature data, which may include one or more acoustic-feature vectors such as LFBE vectors. Other types of feature vectors may be similarly created and used; for example, the feature vectors may include Mel-frequency cepstrum coefficients (MFCCs).

The AFE 324 may include an analysis filterbank that processes one or more frames audio data (and/or other sequential input data). The audio data may be a digital representation of an analog audio signal, which may represent an utterance and/or an acoustic event. The analysis filterbank may include hardware, software, and/or firmware for converting the time-domain audio data of the audio data into frequency-domain audio data. This conversion may be performed by implementing a Fourier transform algorithm, such as a fast Fourier transform (FFT) or discrete-time Fourier transform (DTFT). The analysis filterbank may further include two or more filters for separating the frequency range of the resultant frequency-domain audio data into two or more frequency ranges or bins. For example, the analysis filterbank may separate a frequency range of 20 Hz-20 kHz into 20 bins. The analysis filterbank may thus output M frequency ranges, wherein M may equal 20.

An energy estimation component may receive as input the frequency data, process it to determine one or more values that represent an estimated energy of the frequency data, and output corresponding acoustic feature data for each audio frame. If M acoustic features are extracted, the acoustic feature data may include one or more acoustic feature vectors of size M. The energy estimation component may include one or more filters that, given the frequency data, determine one or more magnitudes of audio energy for each bin of frequency data. These magnitudes may be represented by one or more integer and/or fixed-point values of the acoustic feature vector. The energy estimation component may determine the magnitudes by, for example, averaging the frequency data or performing a root-mean-square operation on the frequency data. The energy estimation component may, prior to processing the frequency data, convert the frequency data from a first frequency format (e.g., Hertz) to a second frequency format (e.g., Mel). The energy estimation component may then perform a logarithm operation to determine the log-filterbank energies (LFBEs) of each bin. The acoustic feature data may thus include one or more LFBE vectors. In other embodiments, the energy estimation component may perform a linear cosine transform on the logarithm of the frequency data to determine Mel-frequency cepstrum coefficients (MFCC), which may instead or in addition be represented by the acoustic feature data. The dimension of each acoustic feature vector of the acoustic feature data (which may be 20) may correspond to the number M of frequency bins (which may be 20).

The user device 110 may include one or more components for detecting and/or classifying acoustic events. The acoustic event detection components may include an encoder 342, a decoder 343, and a detector 345. The encoder 342, decoder 343, and detector 345 may be referred to collectively as AED components, such as the AED components 295 illustrated in FIG. 2D. The AED components may receive the audio data 331 from the AFE 324. This audio data may be a digital representation of an analog audio signal and may be sampled at, for example, 256 kHz. The AED components 295 may instead or in addition receive acoustic feature data, which may include one or more LFBE and/or MFCC vectors, from the acoustic front end 324 as described above. The audio data 331 may include frames, where each frame may represent audio data or audio features for segment of audio data; for example, 30 ms. The AED components 295 may process the audio data 331 in blocks; for example, where a block represents 1 s, 3 s, 5 s, 10 s, or some other duration of audio. The audio data 331 may be processed in portions such as a first portion 331a, a second portion 331b, etc. Each portion of the audio data 331 may correspond to one or more frames.

The encoder 342 may be configured to process portions of the audio data 331 and generate audio feature data 344. The encoder 342 may include a machine learning component or model such as a neural network, random forest, linear regression, logistic regression, decision trees, Naïve Bayes, etc. The encoder 342 may send the audio feature data 344 to the decoder 343. The decoder 343 may be configured to process the audio feature data 344 to predict a subsequent portion of the audio data (e.g., the LFBE of a subsequent frame of audio data), and generate predicted audio data 332.

The encoder 342 may additionally send the audio feature data 344 to the detector 345. The detector component 345 may include any type of logic and/or software configured to detect a potential presence of an event represented in the audio feature data 344. The detector 345 may include a machine learning component such as a neural network (or other machine learning model/algorithm) classifier pre-trained to detect and/or classify acoustic events represented in the audio feature data 344. The detector 345 may be trained (e.g., by adjusting weights of a neural network based on a training dataset) to recognize the potential presence of one or more acoustic events as represented in the audio feature data 344. Additionally or alternatively, the detector 345 may analyze the audio feature data 344 with respect to stored data to determine event data 347. The stored data may represent audio (e.g., signatures of sounds identifiable in audio feature data) of one or more events. The signatures/events may include system-supplied events as well as user-uploaded events, allowing users to create custom actions in response to custom events. The detector component 345 may determine, based at least in part on the audio feature data 344 and stored data, that an instance of one or more events has occurred. The detectors 345 and/or 355 may include, for example, one or more classifiers and/or a comparison component 570 as described below with reference to FIG. 5. The audio feature data 344 may be processed by a detector component 345.

In some implementations, the user device 110 may send the audio feature data 344 to the system component 120. The system component 120 may include a second device detector 355 (e.g., as shown in FIG. 3B), which may perform separate/alternative processing of the audio feature data 344 to determine event data 347. The system 100 may respond to the event data 347 as described below with reference to FIG. 7.

The system 100 may include features for updating the various models on the user device 110 and system component 120. FIG. 3A illustrates an example of updating encoders 342 and/or decoders 343 on the user device 110, and FIG. 3B illustrates an example of updating encoders/decoders 352 and/or detectors 355 on the system component 120. As described further below, a component 341 may calculate loss between predicted audio data and subsequently received audio data. The component 341 may further calculate gradient and/or weight data 351, which the user device 110 may use to update weights of the encoder 342 and/or decoder 343. The user device 110 may send the weight/gradient data 351 to the system component 120, which may aggregate weight/gradient data 351 from the user device 110 and/or additional devices using an update aggregator 353. The update aggregator 353 may generate encoder/decoder update data 358, which the system component 120 may send to the user device 110. The user device 110 may receive the encoder/decoder update data 358, and use it to update weights of the encoder 342 and decoder 343. In some implementations, the component 341 may additionally calculate gradient data 351 based on an update to a vector of an acoustic event profile. The user device 110 may also receive update data from the system component 120 and use it to update acoustic event profiles.

FIG. 3A illustrates example operations of the system 100 processing input audio 12, updating user device 110 models based on self-supervised learning, and further updating user device 110 models based on federated learning using update data from the user device 110 as well as other devices. The system 100 may start with a first version encoder 342 and a first version decoder 343, and update one or both to a second version encoder 342 and/or a second version decoder 343 (e.g., as shown in FIG. 3B, Given audio data 331 consisting of, $x=(x_1, x_2, \ldots x_N)$, where N is a length of a block of audio data (e.g., 10 seconds of audio data divided into N frames), the encoder 342, decoder 343, and detector may be pre-trained to make binary predictions $z \in (0, 1)$ on whether a certain event is represented in audio data x. The models (e.g., the encoder 342, decoder 343, and/or detector 345) may be pre-trained using an annotated dataset $D_{server}=\{(x, z)\}$. As the user device 110 processes input data, it may generate an unlabeled dataset $D_{client}=\{x\}$. $D_{client}$ may be stored in the user device 110 such that user audio data does not leave the user device 110. The user device 110 may be one of K client devices $S=(S_1, S_2, \ldots S_K,)$ for the purposes of applying federated learning techniques to user device 110 model updates.

The system 100 may use $D_{server}$ to pre-train the models including weights $w_{enc}$ of the encoder ($g_{enc}$: x→h, x∈ $\mathbb{R}^n$, h∈ $\mathbb{R}^m$) and weights $w_{dec}$ the decoder ($g_{dec}$: h→x, h∈ $\mathbb{R}^m$, x∈ $\mathbb{R}^n$), where n represents a dimension of the audio data (e.g., log filterbank energies), and m represents a dimension of a feature vector of the audio feature data determined by the encoder 342. The encoder 342 may process a first portion of the audio data 331a ($x_1$) to generate audio feature data 344 ($h_1$). The decoder 343 may process the audio feature data 344 to generate predicted second audio data 332a representing an expected subsequent portion of the audio data (e.g., a predicted $x_{i+n}$, where n represents a number of steps the prediction is ahead of $x_i$). The component 341 may calculate a loss (e.g., an L1 loss) between the predicted $x_{i+n}$ and the actual $x_{i+n}$. The system 100 may optimize the reconstructed loss between a predicted sequence $y=(y_1, y_2, \ldots y_N)$ and the target sequence $t=(x_{1+n}, x_{2+n}, \ldots x_{N+n})$.

The system 100 may deploy the model weights $w_{enc}$ and we to the user device 110. The user device 110 may generate the encoder 342 using $w_{enc}$, and the decoder 343 using $w_{dec}$. The user device 110 may process data $D_{client}$ representing audio data received (or generated) by the user device 110. $D_{client}$ may include a first portion of audio data 331a, which the encoder 342 may process to determine audio feature data 344. The first device detector 345 may process the audio feature data 344 to determine event data 347. The decoder 343 may also process the audio feature data 344 to determine predicted second audio data 332a. The component 341 may analyze the predicted second audio data 332a with respect to a second portion of audio data 331b to determine a loss between the respective data and calculate gradients and/or adjusted weight data 351a for the encoder and/or decoder. The system 100 may repeat this process several or many times (e.g., by comparing predicted third audio data 332b with subsequently received third audio data 331c to generate additional weight/gradient data 351b, and so on). The system 100 may also continue processing subsequent audio feature data 344 using the detector 345 to generate the event data 347 and/or additional event data 347.

In some cases, an encoder/decoder updater 349 of the user device 110 may use the adjusted weight data 351a to update the encoder 342 and/or the decoder 343. The user device 110 may process the subsequent portions of the audio data 331 (e.g., third audio data 331c) using the updated encoder 342 to determine subsequent audio feature data 344.

In some cases, the user device 110 may send weight and/or gradient data 351a and 351b (collectively "weight and/or gradient data 351") to the system component 120. An update aggregator 353 may aggregate the updates (e.g., from the user device 110 as well as additional weight/gradient data 351c from other user devices 110) to generate update data 358a. The system component 120 may distribute the update data 358a to the user device 110 and other devices. The user device 110 may receive the update data 358a. The encoder/decoder updater 349 of the user device 110 may update encoder and/or decoder weights to generate the updated encoder 342 and/or decoder 343.

Applying the federated learning framework, the loss function can be written as in the equations below, where $$n_k = |D_k| \text{ and } n = \sum_{k=1}^{K} n_k$$

$$\min_{w_{enc}, w_{dec}} L(w_{enc}, w_{dec})$$

$$L(w_{enc}, w_{dec}) = \sum_{k=1}^{K} \frac{n_k}{n} l(w_{enc}, w_{dec})$$

$$l_{w_{enc}, w_{dec}} = \sum_{i=1}^{N-n} |x_{i+n} - y_i|$$

Once the models converge, the determine weights $w_{i+1}$ may be distributed to the user device 110 via the update data 358a, and used to generate the updated encoder 342 and/or decoder 343. The system 100 may update the encoder 342 and/or decoder 343 one, several, or many times as iterations of federated learning progress.

Further AED performance gains may be achieved by retraining the detector 345 to process audio feature data generated by the updated encoder 342. FIG. 3B illustrates example operations of the system 100 retraining the detector 345. The system component 120 may include a second device model updater 356, which may update second device models such as a second device encoder/decoder 352 and a second device detector 355. The second device encoder/decoder 352 may represent a current version of the encoder 342 and/or decoder 343 (e.g., based on the latest update). The second device model updater 356 may use the original annotated dataset Diener to retrain the second device encoder/decoder 352 and/or the second device detector 355. The results of the retraining may include detector update data 359 and/or encoder/decoder update data 358c. The system component 120 may send the detector update data 359 and/or encoder/decoder update data 358c to the user device 110 for updating the first device models. The detector 345 update process may proceed as follows.

The update aggregator 353 may aggregate the weight/gradient data 351b (as well as weight/gradient data 351c received from other user devices 110) to generate the update data 358b. The update data 358b may include weights for updating the second device encoder/decoder 352. The second device model updater 356 may retrain the detector 355 to generate an updated detector 355. The second device model updater 356 may process the original annotated dataset (e.g., which may be the same dataset $D_{server}$ used to train the initial models of the system 100) using the second device encoder/decoder 352 and the detector 355. In some implementations, the second device model updater 356 may keep the weights of the second device encoder/decoder 352 at constant values during training, and only update the weight values of the detector 355. In some implementations, the system 100 may use the most recent encoder 342 and/or decoder 343 weights as initial weights for the second device encoder/decoder 352 when initializing the training, and update the weights during the training. Thus, the updated detector 355 may be optimized to process audio feature data 344 generated by most recent versions of the encoder 342 and decoder 343. The second device model updater 356 may send the detector updates to the user device 110, where a detector updater 346 may update weights of the first version detector 345 to generate a second version detector 345. If the weights of the second device encoder/decoder 352 are updated during training, the updated weights may be sent to the user device 110 as an update to the encoder 342 and/or decoder 343 (e.g., as the update data 358c) along with updated weights for the detector 345 (e.g., the detector update data 359). The encoder/decoder updater 349 of the user device 110 may update weights of the encoder 342 and/or the decoder 343 using the update data 358c. The detector updater 346 may update weights of the detector 345 using the detector update data 359.

The detector 345 may include a classifier ($g_c$:h→p, h∈ $\mathbb{R}_m$, p∈$\mathbb{R}$) that may as input the output of the encoder—that is, the audio feature data—and may output the binary predictions z∈{0, 1}. The weights of second device encoder/decoder ($w_{t+1}$) may be used as initializing weights for the training, or held constant during training of the classifier. In some implementations, the classifier may be trained using a modified binary cross-entropy loss as shown in the equation below:

$$l_c = -[c \cdot z_n \cdot \ln p_n + (1-z_n)\ln(1-p_n)]$$

where c may be a positive scaling factor to adjust the loss for positive samples. This technique may be extended to multi-class classification problems by adding a binary classifier for each new class of event following a one-vs.-all paradigm.

Thus, the self-supervised federated learning techniques may be applied in three stages for K clients indexed by k, where B is the local minibatch size, E is the number of local training epochs, and n is the learning rate.

State I may include pre-training model weights $w_0$ using the $D_{server}$ dataset, and distributing the weights to the user devices 110.

Stage II may include federated self-supervised learning for T rounds t=1, 2 . . . . In each round, update a random set of m clients→$S_t$. For each client k∈ $S_t$, perform a ClientUpdate (k, $w_t$)→$w_{t+1}^k$. Stage II may continue until all clients have been updated:

$$w_{t+1} = \sum_{k=1}^{K} \frac{n_k}{n} w_{t+1}^k.$$

Stage III may include training the classifier based on the latest encoder/decoder updates using the $D_{server}$ dataset; that is, the encoder weights $w_{enc}$ may be fixed. For B in $D_{server}$, the encoder may determine h←$g_{enc}$(B), the classifier may determine p'←$g_c$(h), and new classifier weights may be determined: $w_c$←$w_c$−η∇/(w; b). Finally, the classifier update may be sent to the clients. The user device 110 may receive the classifier update, and a detector updater 346 of the user device 110 may update the first device detector 345. The encoder updater 349 may update the encoder 342 and/or decoder 343 using the latest update data 358—that is, update data 358 reflecting encoder weights used when training the classifier—to generate an updated encoder 342 and/or decoder 343. The operations illustrated in FIGS. 3A and 3B may be repeated as the user device 110 (and other user devices 110) process additional $D_{client}$ and further refine their models. In some implementations, classifier updates may follow several encoder/decoder updates. For example, the system 100 may deploy version 1.0 models, with each encoder/decoder update incrementing the decimal with successive versions 1.1, 1.2, 1.3, etc. The system 100 may deploy version 2.0 models including a classifier update to accompany the latest encoder/decoder update. The system 100 may continue to deploy updated encoder/decoder models using the same classifier through successive versions 2.1, 2.2, 2.3, etc., and so on.

Figure 3C:
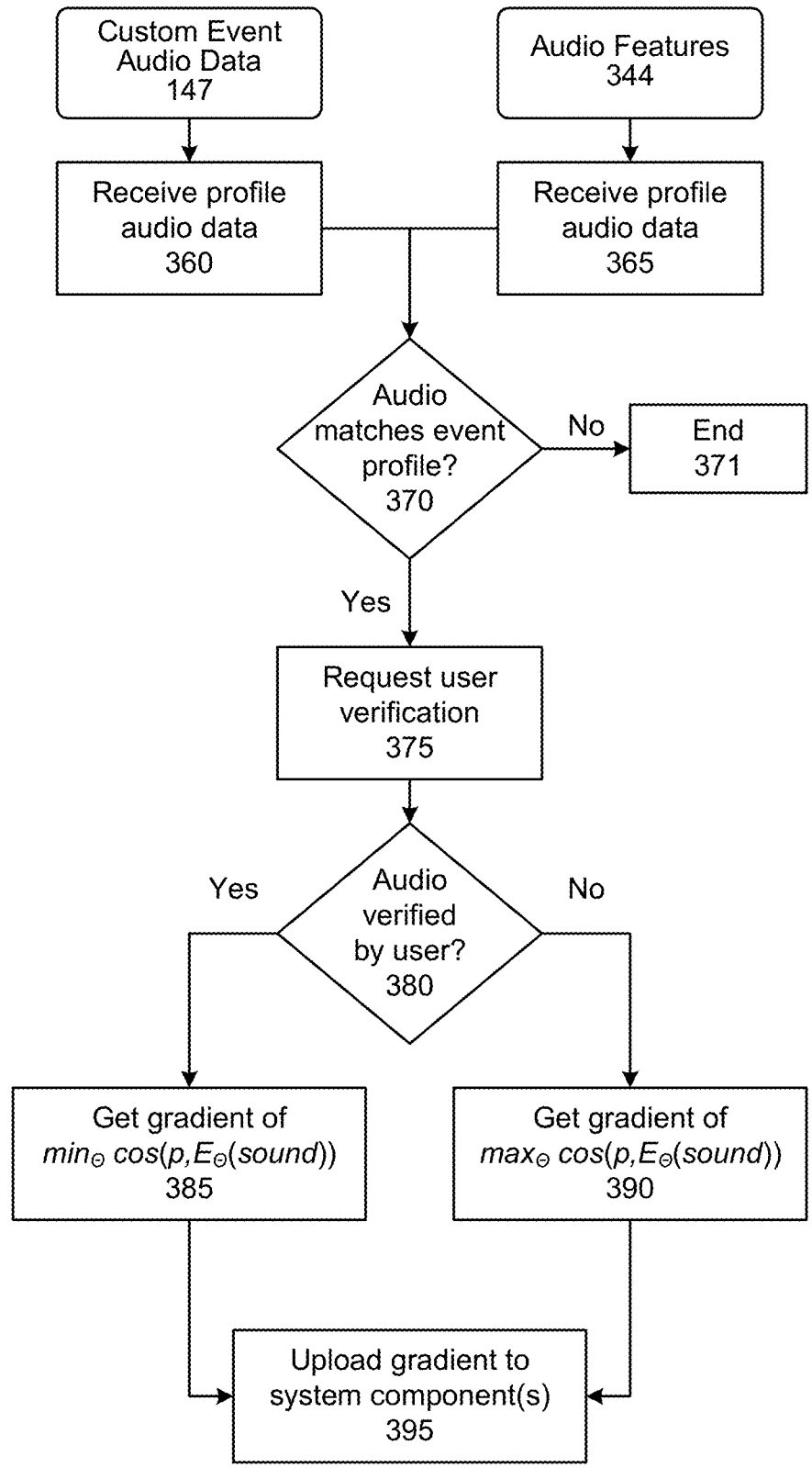
FIG. 3C is a flowchart illustrating example privacy-preserving operations for updating the cloud-based acoustic event detection model, according to embodiments of the present disclosure.

FIG. 3C is a flowchart illustrating example privacy-preserving operations for updating a cloud-based acoustic event detection model, according to embodiments of the present disclosure. The operations may be performed by the system 100 including on a user device 110 and/or one or more system components 120. The operations may include receiving (360) the custom event audio data 147 (e.g., from the acoustic event profile component 150) and receiving (365) the detected audio feature data 344 (e.g., as generated from audio data 331 by the encoder 342). The operations may include determining (370) whether the audio feature data 344 match the custom event audio data 147 by, for example, meeting a threshold cosine similarity value or some other similarity or confidence metric. If the system 100 determines that the audio feature data 344 do not match the custom event audio data ("No" at 370) the operations end (371) until further audio features are received. If the system 100 determines that the audio feature data 344 match the custom event audio data ("Yes" at 370) the system 100 may request (375) user verification of the detected event. The system 100 may playback the audio data 331 of the sound and receive a user response. If the user states that the sound does not correspond to the custom event ("No" at 380), the system may calculate (385) a gradient for updating the custom event audio data 147 (e.g., by moving the vector representing the audio embedding of the custom event away from the vector representing the audio feature data 344 and/or lowering a threshold for detection). In some implementations, the gradient may be calculated according to mine cos (p,$E_0$(sound). If the user states that the sound does correspond to the custom event ("Yes" at 380), the system may calculate (390) a gradient for updating the custom event audio data 147 (e.g., by moving the vector representing the audio embedding of the custom event toward the vector representing the audio feature data 344 and/or raising a threshold for detection). In some implementations, the gradient may be calculated according to $\max_\theta \cos(p, E_\theta(\text{sound}))$. The system 100 may upload (395) the gradient data from the user device 110 to one or more system components 120.

FIG. 4 is conceptual diagram illustrating a user device and a system component configured for detecting an acoustic event and processing speech, according to embodiments of the present disclosure. The system 100 may include a user device 110, which may be in communication with one or more additional system components 120 and/or skill support system components 425 over one or more computer networks 199. The system 100 may include components and/or features for processing natural language, including processing related to ASR, NLU, NLG, and/or TTS.

The system 100 may operate using various components as described in FIG. 4. The various components may be located on same or different physical devices. Communication between various components may occur directly or across a network(s) 199. The user device 110 may include audio capture component(s), such as a microphone 920 or array of microphones of a user device 110, captures audio 11 (e.g., including event audio 113 and/or user speech, etc.) and creates corresponding audio data. Once speech is detected in audio data representing the audio 11, the user device 110 may determine if the speech is directed at the user device 110/system component 120, In at least some embodiments, such determination may be made using a wakeword detection component 426. The wakeword detection component 426 may be configured to detect various wakewords. In at least some examples, each wakeword may correspond to a name of a different digital assistant. An example wakeword/ digital assistant name is "Alexa." In another example, input to the system may be in form of text data 413, for example as a result of a user typing an input into a user interface of user device 110. Other input forms may include indication that the user has pressed a physical or virtual button on user device 110, the user has made a gesture, etc.

The wakeword detector 426 of the user device 110 may process the audio data, representing the audio 11, to determine whether speech is represented therein. The user device 110 may use various techniques to determine whether the audio data includes speech. In some examples, the user device 110 may apply voice-activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the user device 110 may implement a classifier configured to distinguish speech from background noise. The classifier may be implemented by techniques such as linear classifiers, support vector machines, and decision trees. In still other examples, the user device 110 may apply hidden Markov model (HMM) or Gaussian mixture model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data corresponding to a wakeword.

Thus, the wakeword detection component 426 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 426 may be built on deep neural network (DNN)/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword is detected by the wakeword detector 426 and/or input is detected by an input detector, the user device 110 may "wake" and begin processing audio data 162, representing the audio 11, and/or transmitting the audio data 162 to a system component 120 for processing. The audio data 162 may include data corresponding to the wakeword; in other embodiments, the portion of the audio corresponding to the wakeword is removed by the user device 110 prior to sending the audio data 162 to the system component(s) 120. In the case of touch input detection or gesture-based input detection, the audio data may not include a wakeword.

In some implementations, the system 100 may include more than one system component 120. The system components 120 may respond to different wakewords and/or perform different categories of tasks. Each system component 120 may be associated with its own wakeword such that speaking a certain wakeword results in audio data be sent to and processed by a particular system. For example, detection of the wakeword "Alexa" by the wakeword detector 426 may result in sending audio data to a first system component 120 for processing while detection of the wakeword "Computer" by the wakeword detector may result in sending audio data to a second system component 120 for processing. The system may have a separate wakeword and system for different skills/systems (e.g., "Dungeon Master" for a game play skill/system component 120) and/or such skills/systems may be coordinated by one or more skill components 490a, 490b, 490c, etc., (collectively "skill component(s) 490") of one or more system components 120.

Upon receipt by the system 100, the audio data 162 may be sent to an orchestrator component 430. The orchestrator component 430 may include memory and logic that enables the orchestrator component 430 to transmit various pieces and forms of data to various components of the system, as well as perform other operations as described herein.

The orchestrator component 430 may send the audio data 162 to a language processing component 492. The language processing component 492 (sometimes also referred to as a spoken language understanding (SLU) component) includes an automatic speech recognition (ASR) component 450 and a natural language understanding (NLU) component 460. The ASR component 450 may transcribe the audio data 162 into text data. The text data output by the ASR component 450 represents one or more than one (e.g., in the form of an N-best list) ASR hypotheses representing speech represented in the audio data 162. The ASR component 450 interprets the speech in the audio data 162 based on a similarity between the audio data 162 and pre-established language models. For example, the ASR component 450 may compare the audio data 162 with models for sounds (e.g., acoustic units such as phonemes, senones, phones, etc.) and sequences of sounds to identify words that match the sequence of sounds of the speech represented in the audio data 162. The ASR component 450 sends the text data generated thereby to an NLU component 460, via, in some embodiments, the orchestrator component 430. The text data sent from the ASR component 450 to the NLU component 460 may include a single top-scoring ASR hypothesis or may include an N-best list including multiple top-scoring ASR hypotheses. An N-best list may additionally include a respective score associated with each ASR hypothesis represented therein.

The language processing components 492 may further include a NLU component 460. The NLU component 460 may receive the text data from the ASR component. The NLU component 460 may attempts to make a semantic interpretation of the phrase(s) or statement(s) represented in the text data input therein by determining one or more meanings associated with the phrase(s) or statement(s) represented in the text data. The NLU component 460 may determine an intent representing an action that a user desires be performed and may determine information that allows a device (e.g., the user device 110, the system component(s) 120, a skill component 490, a skill support system component 425, etc.) to execute the intent. For example, if the text data corresponds to "play the 5th Symphony by Beethoven," the NLU component 460 may determine an intent that the system output music and may identify "Beethoven" as an artist/composer and "5th Symphony" as the piece of music to be played. For further example, if the text data corresponds to "what is the weather," the NLU component 460 may determine an intent that the system output weather information associated with a geographic location of the user device 110. In another example, if the text data corresponds to "turn off the lights," the NLU component 460 may determine an intent that the system turn off lights associated with the user device 110 or the user 5. However, if the NLU component 460 is unable to resolve the entity—for example, because the entity is referred to by anaphora such as "this song" or "my next appointment"—the language processing components 492 may send a decode request to another system component 120 for information regarding the entity mention and/or other context related to the utterance. The language processing components 492 may augment, correct, or base results data upon the audio data 162 as well as any data received from the other system component 120.

The NLU component 460 may return NLU results data (which may include tagged text data, indicators of intent, etc.) back to the orchestrator component 430, The orchestrator component 430 may forward the NLU results data to a skill component(s) 490. If the NLU results data includes a single NLU hypothesis, the NLU component 460 and the orchestrator component 430 may direct the NLU results data to the skill component(s) 490 associated with the NLU hypothesis. If the NLU results data includes an N-best list of NLU hypotheses, the NLU component 460 and the orchestrator component 430 may direct the top scoring NLU hypothesis to a skill component(s) 490 associated with the top scoring NLU hypothesis. The system 100 may also include a post-NLU ranker which may incorporate other information to rank potential interpretations determined by the NLU component 460.

A skill component may be software running on the system component(s) 120 that is akin to a software application. That is, a skill component 490 may enable the system component(s) 120 to execute specific functionality in order to provide data or produce some other requested output. As used herein, a "skill component" may refer to software that may be placed on a machine or a virtual machine (e.g., software that may be launched in a virtual instance when called). A skill component may be software customized to perform one or more actions as indicated by a business entity, device manufacturer, user, etc. What is described herein as a skill component may be referred to using many different terms, such as an action, bot, app, or the like. The system component(s) 120 may be configured with more than one skill component 490, For example, a weather service skill component may enable the system component(s) 120 to provide weather information, a car service skill component may enable the system component(s) 120 to book a trip with respect to a taxi or ride sharing service, a restaurant skill component may enable the system component(s) 120 to order a pizza with respect to the restaurant's online ordering system, etc. A skill component 490 may operate in conjunction between the system component(s) 120 and other devices, such as the user device 110, in order to complete certain functions. Inputs to a skill component 490 may come from speech processing interactions or through other interactions or input sources. A skill component 490 may include hardware, software, firmware, or the like that may be dedicated to a particular skill component 490 or shared among different skill components 490.

A skill support system component(s) 425 may communicate with a skill component(s) 490 within the system component(s) 120 and/or directly with the orchestrator component 430 or with other components. A skill support system component(s) 425 may be configured to perform one or more actions. An ability to perform such action(s) may sometimes be referred to as a "skill." That is, a skill may enable a skill support system component(s) 425 to execute specific functionality in order to provide data or perform some other action requested by a user. For example, a weather service skill may enable a skill support system component(s) 425 to provide weather information to the system component(s) 120, a car service skill may enable a skill support system component(s) 425 to book a trip with respect to a taxi or ride sharing service, an order pizza skill may enable a skill support system component(s) 425 to order a pizza with respect to a restaurant's online ordering system, etc. Additional types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any pre-configured type of skill.

The system 100 may be configured with a skill component 490 dedicated to interacting with the skill support system component(s) 425. Unless expressly stated otherwise, reference to a skill, skill device, or skill component may include a skill component 490 operated by the system component(s) 120 and/or skill operated by the skill support system component(s) 425. Moreover, the functionality described herein as a skill or skill may be referred to using many different terms, such as an action, bot, app, or the like. The skill component 490 and or skill support system component(s) 425 may return output data to the orchestrator component 430.

The system 100 may include language output components 493. The language output component 493 includes a natural language generation (NLG) component 479 and a text-to-speech (TTS) component 480. The NLG component 479 can generate text for purposes of TTS output to a user. For example, the NLG component 479 may generate text corresponding to instructions corresponding to a particular action for the user to perform. The NLG component 479 may generate appropriate text for various outputs as described herein. The NLG component 479 may include one or more trained models configured to output text appropriate for a particular input. The text output by the NLG component 479 may become input for the TTS component 480 (e.g., output text data discussed below). Alternatively or in addition, the TTS component 480 may receive text data from a skill component 490 or other system component for output.

The NLG component 479 may include a trained model. The NLG component 479 generates text data (e.g., from dialog data received by the dialog manager) such that the output text data has a natural feel and, in some embodiments, includes words and/or phrases specifically formatted for a requesting individual. The NLG may use templates to formulate responses. And/or the NLG system may include models trained from the various templates for forming the output text data. For example, the NLG system may analyze transcripts of local news programs, television shows, sporting events, or any other media program to obtain common components of a relevant language and/or region. As one illustrative example, the NLG system may analyze a transcription of a regional sports program to determine commonly used words or phrases for describing scores or other sporting news for a particular region. The NLG may further receive, as inputs, a dialog history, an indicator of a level of formality, and/or a command history or other user history such as the dialog history.

The NlG system may generate dialog data based on one or more response templates. Further continuing the example above, the NLG system may select a template in response to the question, "What is the weather currently like?" of the form: "The weather currently is $weather_information$." The NLG system may analyze the logical form of the template to produce one or more textual responses including markups and annotations to familiarize the response that is generated. In some embodiments, the NLG system may determine which response is the most appropriate response to be selected. The selection may, therefore, be based on past responses, past questions, a level of formality, and/or any other feature, or any other combination thereof. Responsive audio data representing the response generated by the NLG system may then be generated using the text-to-speech component 480.

The TTS component 480 may generate audio data (e.g., synthesized speech) from text data using one or more different methods. Text data input to the TTS component 480 may come from a skill component 490, the orchestrator component 430, or another component of the system. In one method of synthesis called unit selection, the TTS component 480 matches text data against a database of recorded speech. The TTS component 480 selects matching units of recorded speech and concatenates the units together to form audio data. In another method of synthesis called parametric synthesis, the TTS component 480 varies parameters such as frequency, volume, and noise to create audio data including an artificial speech waveform. Parametric synthesis uses a computerized voice generator, sometimes called a vocoder.

The system 100 may include an AED component 295. Acoustic Event Detection (AED), as referred to herein, includes a use of computer science, such as artificial intelligence, that relates to processing audio data representing a sound, such as a non-speech sound, to determine when and if a particular acoustic event is represented in the audio data. An AED component 295 may be used as, for example, a part of a smart home system or an alarm system that may detect and possibly take one or more actions in response to detecting a representation of an acoustic event in audio data 162. An AED component 295 may be configured to detect and act upon different types of acoustic events. An acoustic event may be an event identified in the presence of an acoustic background (e.g., background noise) represented in audio data; for example, and without limitation, a door opening, a doorbell ringing, breaking glass, footsteps, a baby crying, a smoke alarm, etc. Such acoustic events may be distinguished from uneventful background noise such as wind, traffic, HVAC equipment, etc. The AED component 295 may respond to a detected event by turning on a light, adjusting environmental settings, triggering an alarm, sending a notification to a user, recording video using a camera, etc. The AED component 295 may include one or more machine learning components configured to process the audio data 162. The AED component 295 may send detected event data 347 to an event notification component 448 (or other component such as a smart home skill as shown in FIG. 8). AED and event notification are described further below with reference to FIGS. 5 through 7.

The system 100 may include an event notification component 428. The event notification component 448 may handle sending notifications/commands to other devices upon the occurrence of a detected acoustic event. The event notification component 448 may have access to information/instructions (for example as associated with profile storage 270 or otherwise) that indicate what device(s) are to be notified upon detection of an acoustic event, the preferences associated with those notifications or other information. The event notification component 448 may have access to information/instructions (for example as associated with profile storage 470 or otherwise) that indicate what device(s) are to perform what actions in response to detection of an acoustic event (for example locking a door, turning on/off lights, notifying emergency services, or the like. Further detail regarding the event notification component may be found below with regard to FIG. 7.

In some implementations, a user may opt in to receiving certain acoustic event-related content. For example, based on detection of a chronically barking dog, the event notification component 448 may retrieve and provide information about dog training, suggests for enrichment activities/toys, and/or advertisements to related products/services. Based on the detection of broken glass, the event notification component 448 may retrieve and provide information about window replacement. Other such notifications may be possible, such as suggesting a plumber in response to detecting a chronically dripping faucet, recommending movies based on detecting rain/thunder, etc.

In some implementations, a user may configure the system 100 to perform one or more actions based on detection of one or more acoustic events. The actions may be performed (or caused to be performed) by the event notification component 448 and/or other components of the system 100 such as the smart home system 800 and its components. For example, the user may configure the system 100 to turn a light or lights in response to detecting the front door open and footsteps entering. Similarly, the user may configure the system 100 to turn off the light(s) after 60 seconds of silence following detection of a door close. Other possible configurations may include automatically closing windows/skylights if rain is detected, unlocking a pet door (to let a dog in or out) if a known bark is detected, turning on a light or lights if glass breaking is detected, etc.

The system 100 (either on user device 110, system component 120, or a combination thereof) may include profile storage 470 for storing a variety of information related to individual users, groups of users, devices, etc, that interact with the system. As used herein, a "profile" refers to a set of data associated with a user, group of users, device, etc. The data of a profile may include preferences specific to the user, device, etc.; input and output capabilities of the device; internet connectivity information; user bibliographic information; subscription information, as well as other information.

The profile storage 470 may include one or more user profiles, with each user profile being associated with a different user identifier/user profile identifier. Each user profile may include various user identifying data. Each user profile may also include data corresponding to preferences of the user. Each user profile may also include preferences of the user and/or one or more device identifiers, representing one or more devices of the user. For instance, the user account may include one or more IP addresses, MAC addresses, and/or device identifiers, such as a serial number, of each additional electronic device associated with the identified user account. When a user logs into to an application installed on a user device 110, the user profile (associated with the presented login information) may be updated to include information about the user device 110, for example with an indication that the device is currently in use. Each user profile may include identifiers of skills that the user has enabled. When a user enables a skill, the user is providing the system component 120 with permission to allow the skill to execute with respect to the user's natural language user inputs. If a user does not enable a skill, the system component 120 may not invoke the skill to execute with respect to the user's natural language user inputs.

The profile storage 470 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith, That is, each user profile may include preferences unique from one or more other user profiles associated with the same group profile. A user profile may be a stand-alone profile or may be associated with a group profile.

The profile storage 470 may include one or more device profiles. Each device profile may be associated with a different device identifier. Each device profile may include various device identifying information. Each device profile may also include one or more user identifiers, representing one or more users associated with the device. For example, a household device's profile may include the user identifiers of users of the household.

FIG. 5 is a conceptual diagram illustrating components of an acoustic event detection (AFD) component, according to embodiments of the present disclosure. FIG. 5 illustrates components of the AED component 295. As shown, the AED component 295 may include a feature normalization component 550, a CRNN 560, and a comparison component 570. These components may be configured to detect custom acoustic events defined by the user 105 of the user devices 110.

The feature normalization component 550 may process the acoustic feature data 522 and may determine normalized feature data 552. The feature normalization component 550 may process the acoustic feature data 522, and may perform some normalization techniques. Different environments (e.g., homes, offices, buildings, etc.) have different background noises and may also generate event audio at different levels, intensities, etc. The feature normalization component 550 may process the acoustic feature data 522 to remove, filter, or otherwise reduce the effect, of any environmental differences that may be captured by the user device 110 in the event audio 113, on the processing performed by the CRNN 560 and the comparison component 570. The feature normalization component 550 may use a normalization matrix derived by performing statistical analysis on audio samples corresponding to a wide range of acoustic events.

The CRNN 560 may be an encoder that generates encoded representation data 562 using the normalized feature data 552. The CRNN 560 may include one or more convolutional layers followed by one or more recurrent layer(s) that may process the normalized feature data 552 to determine one or more probabilities that the audio data includes one or more representations of one or more acoustic events. The CRNN 560 may include a number of nodes arranged in one or more layers. Each node may be a computational unit that has one or more weighted input connections, a transfer function that combines the inputs in some way, and an output connection. The CRNN 560 may include one or more recurrent nodes, such as LSTM nodes, or other recurrent nodes, such as gated rectified unit (GRU) noes. For example, the CRNN 560 may include 128 LSTM nodes; each LSTM node may receive one feature vector of the acoustic feature data during each frame. For next frames, the CRNN 560 may receive different sets of 128 feature vectors (which may have one or more feature vectors in common with previously-received sets of feature vectors—e.g., the sets may overlap). The CRNN 560 may periodically reset every, for example, 10 seconds. The CRNN 560 may be reset when a time of running the model (e.g., a span of time spent processing audio data) is greater than a threshold time. Resetting of the CRNN 560 may ensure that the CRNN 560 does not deviate from the state to which it had been trained. Resetting the CRNN 560 may include reading values for nodes of the model—e.g., weights—from a computer memory and writing the values to the recurrent layer(s).

The CRNN 560 may be trained using ML techniques and training data. The training data, for the CRNN 560, may include audio samples of a wide variety of acoustic events (e.g., sounds from different types/brands of appliances, sounds of different types of pets, etc.). The training data may further include annotation data indicating which acoustic events are of interest and which acoustic events are not of interest. The CRNN 560 may be trained by processing the training data, evaluating the accuracy of its response against the annotation data, and updating the recurrent layer(s) via, for example, gradient descent. The CRNN 560 may be deemed trained when it is able to predict occurrence of acoustic events of interest in non-training data within a required accuracy.

The CRNN 660 may be configured to generate encoded representation data that can be used to detect a wider range of acoustic events, so that the CRNN 560 can be used to detect any custom acoustic event taught by the user 105.

The CRNN 560 may thus receive the acoustic-feature data and, based thereon, determine an AED probability, which may be one or more numbers indicating a likelihood that the acoustic-feature data represents the acoustic event. The AED probability may be, for example, a number that ranges from 0.0 to 1.0, wherein 0.0 represents a 0% likelihood that the acoustic-feature data represents the acoustic event, 1.0 represents a 100% likelihood that the acoustic-feature data represents the acoustic event, and numbers between 0.0 and 1.0 represent varying degrees of likelihood that the acoustic-feature data represents the acoustic event. A value of 0.75, for example, may correspond to 75% confidence in the acoustic-feature data including a representation of the acoustic event. The AED probability may further include a confidence value over time and may indicate at which times in the acoustic-feature data that the acoustic event is more or less likely to be represented.

A number of activation function components—one for each acoustic event—may be used to apply an activation function to the probability of occurrence of that event output by the recurrent layer(s). The activation function may transform the probability data such that probabilities near 50% are increased or decreased based on how far away from 50% they lie; probabilities closer to 0% or 100% may be affected less or even not at all. The activation function thus provides a mechanism to transform a broad spectrum of probabilities—which may be evenly distributed between 0% and 100%—into a binary distribution of probabilities, in which most probabilities lie closer to either 0% or 100%, which may aid classification of the probabilities as to either indicating an acoustic event or not indicating an acoustic event by an event classifier. In some embodiments, the activation function is a sigmoid function.

In some embodiments, the CRNN 560 may be configured to convert a higher dimensional feature vector (the normalized feature data 552) to a lower dimensional feature vector (the encoded representation data 562). The CRNN 560 may process multiple frames of acoustic feature data 522, represented in the normalized feature data 552, corresponding to an acoustic event and may ultimately output a single N-dimensional vector that uniquely identifies the event. That is, a first N-dimensional vector is first encoded representation data that represents a first predetermined acoustic event, a second N-dimensional vector is second encoded representation data that represents a second predetermined acoustic event, and so on. The N-dimensional vectors may correspond to points in an N-dimensional space known as an embedding space or feature space; in this space, data points that represent similar-sounding events are disposed closer to each other, while data points that represent different-sounding events are disposed further from each other. The CRNN 560 may be configured by processing training data representing a variety of events; if the CRNN 560 processes two items of audio data from two events known to be different, but maps them to similar points in the embedding space, the CRNN 560 is re-trained so that it maps the training data from the different events to different points in the embedding space. Similarly, if the CRNN 560 processes two items of audio data from two events known to be similar, but maps them to different points in the embedding space, the CRNN 560 is re-trained so that it maps the training data from the similar events to similar points in the embedding space.

The comparison component 570 may be configured to process the encoded representation data 562 with respect to one or more acoustic event profile data 582 using a corresponding threshold 584. As described herein, the custom AED profile storage 155 may store the acoustic event profile data 582 and the corresponding threshold 584 based on the user 105 configuring the system component(s) 120 to identify a custom acoustic event. Each of the acoustic event profile data 582 may be acoustic feature data corresponding to a single individual custom acoustic event. For example, first acoustic event profile data 582a may correspond to a custom doorbell sound, second acoustic event profile data 582b may correspond to a particular breed dog bark, etc. Each of the thresholds 584 may be a threshold value of similarity, and may correspond to a single individual custom acoustic event. For example, a first threshold 584a may be a first threshold value corresponding to the first acoustic event profile data 582a, a second threshold 584b may be a second threshold value corresponding to the second acoustic event profile data 582b, etc.

The comparison component 570 may process the encoded representation data 562 with respect to each of the acoustic event profile data 582, and may determine how similar the encoded representation data 562 is to the acoustic event profile data 582. The comparison component 570 may determine such similarity using various techniques, for example, using a cosine similarity, using a number of overlapping data points within a feature space, using a distance between data points within a feature space, etc. The comparison component 570 may determine that the encoded representation data 562 corresponds to the custom acoustic event represented in the acoustic event profile data 582 when the similarity satisfies the corresponding threshold 584. The similarity may be represented as one or more numerical values or a vector of values, and the threshold 584 may be represented as single numerical value. In some embodiments, the average of the similarity values may exceed/satisfy the threshold 584 for the comparison component 570 to determine that the corresponding custom acoustic event occurred. As described herein, the encoded representation data 562 is a vector and the acoustic event profile data 582 is a vector, and in some embodiments, if each of the values of the encoded representation data 562 (e.g., each of the values of the N-vector) are within the threshold 584 of each of the corresponding values of the acoustic event profile data 582, the comparison component 570 may determine that the corresponding custom acoustic event occurred.

The comparison component 570 may evaluate the encoded representation data 562 with respect to each of the acoustic event profile data 582, and may determine, in some cases, that more than one custom acoustic event is represented in the event audio 113. For example, the comparison component 570 may process the encoded representation data 562 with respect to the first acoustic event profile data 582a to determine first similarity data that satisfies the first threshold 584a, and may process (in parallel) the encoded representation data 562 with respect to the second acoustic event profile data 582b to determine second similarity data that satisfies the second threshold 584b, and may then determine, based on both of the first and second thresholds 584 being satisfied, that the first and second custom acoustic events occurred.

The AED component 295 may output detected event data 347 representing one or more custom acoustic events occurred based on processing the event audio 113. The detected event data 347 may be an indication (e.g., a label, an event identifier, etc.) of the custom acoustic event represented in the event audio 113. For example, the detected event data 347 may be data indicating that a dog barking event occurred. In some cases, the event audio 113 may represent more than one event occurrence, and the detected event data 347 may indicate that more than one of the custom acoustic events occurred. For example, the detected event data 347 may be data indicating that a dog barking event and a fridge door alarm event occurred. If the event audio 113 does not correspond to any of the custom acoustic events, then the detected event data 347 may be null, may indicate "other" or the like.

In some embodiments, the detected event data 347 may correspond to a portion of the event audio 113, for example, a set of audio frames that are processed by the AED component 295. The system component(s) 120 may include an event detection component that may aggregate the results (e.g., detected event data) of the AED component 295 processing sets of audio frames of the event audio data 162 corresponding to the event audio 113. The event detection component may perform further processing on the aggregated results/detected event data to determine an acoustic event represented in the event audio 113. Such further processing may involve normalizing, smoothing, and/or filtering of the results/detected event data.

In some embodiments, the AED component 295 may determine the detected event data 347 in a number of different ways. If multiple samples of the custom acoustic event is used/stored in the acoustic event profile data 582, the AED component 295 may encode each sample to a different point in the embedding space. The different points may define an N-dimensional shape; the comparison component 570 may deem that the encoded representation data 562 defines a point within the shape, or within a threshold distance of a surface of the shape, and thus, indicates occurrence of the corresponding custom acoustic event. In other embodiments, the AED component 295 may determine a single point that represents the various points determined from the various samples of the custom acoustic event. For example, the single point may represent the average of each of the values corresponding to the samples. The single point may further represent the center of the shape defined by the points.

The comparison component 570 may output the detected event data 347 indicating which, if any, of the custom acoustic events (indicated in the custom AED profile storage 155) occurred based on processing of the event audio 113. The detected event data 347 may include one or more labels or indicators (e.g., Boolean values such as 0/1, yes/no, true/false, etc.) indicating whether and which of the custom acoustic events occurred. In some embodiments, each of the acoustic event profile data 582 may be associated with an event identifier (e.g., a numerical identifier or a text identifier), and the detected event data 347 may include the event identifier along with the label/indicator.

The AED component 295 may output an indication of detection of a custom acoustic event as the detected event data 347. Such detected event data 347 may include an identifier of the custom acoustic event, a score corresponding to the likelihood of the custom acoustic event occurring, or other related data. Such detected event data 347 may then be sent, over the network(s) 199, to a downstream component, for example notification system component(s) 121/ event notification component 448 or another device.

Figure 6:
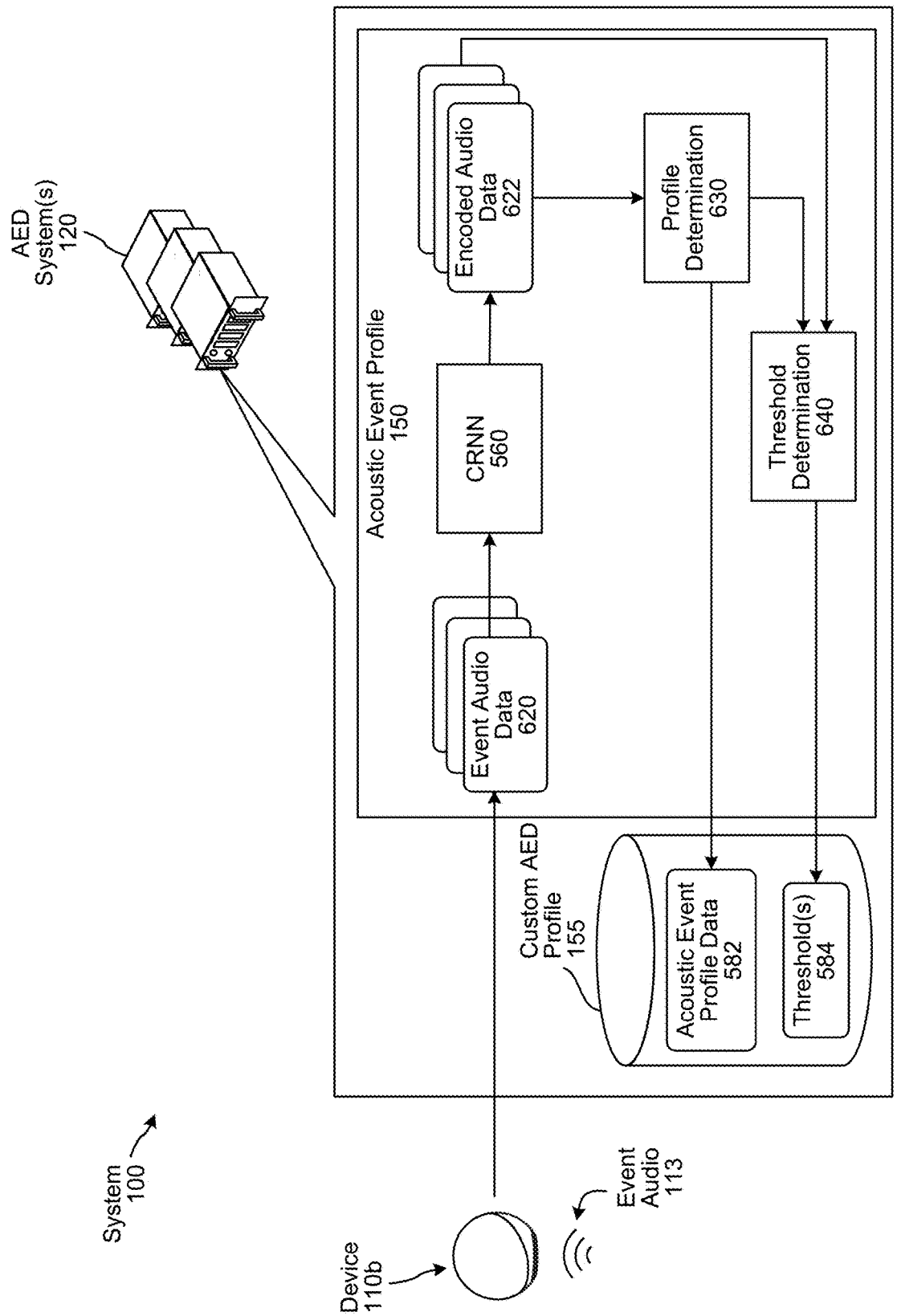
FIG. 6 is a conceptual diagram illustrating a system for generating an acoustic event profile data for a custom acoustic event, according to embodiments of the present disclosure.

FIG. 6 illustrates the system 100 for generating the acoustic event profile data 582 for a custom acoustic event. In some cases, the system 100 may configure the AED component 295 to detect a sound selected by the user 105 of the user device 110. The user 105 may interact with the user device 110a using the speech-processing techniques described herein and command the user device 110 to learn a new sound with a spoken input such as, "Alexa, I want to you learn a new sound." The user device 110a and/or system component(s) 120 may determine the intent of the user 105 by processing corresponding audio data with the ASR and/or NLU techniques described herein. The user device 110a and/or system component(s) 120 may identify the system component(s) 120 as the system to respond to the spoken input. The system component(s) 120 may cause the user device 110a (and/or another device) to output a prompt asking the user 105 to provide a description of the sound that the user wants detected. The system component(s) 120 may further prompt the user 105 to confirm further or other natural language descriptions corresponding to the sound (as described above in relation to FIG. 1A). After determining audio data corresponding to the natural language description of the custom sound, the system component(s) 120 may determine and send event audio data representing occurrence of the custom sound to determine the acoustic event profile data.

The user device 110b may receive event audio 113 representing occurrence of the custom sound. As described above in relation to FIG. 2A, the system component(s) 120 may determine whether the event audio 113 is a sample of the custom sound, and may send a prompt to the user device 110a asking the user 105 to confirm that the event audio 113 represents occurrence of the custom sound. If the user's environment includes multiple user devices 110, each one may receive the event audio 113 representing occurrence of the event. Each instance of the event audio 113 from each user device 110 may be evaluated to determine a quality value, and the user device 110 having the highest quality value may be selected for further processing. The quality metric may be, for example, a signal-to-noise ratio (SNR) of the audio, a loudness of a sound represented in the audio, or other such quality value. The audio may also be evaluated (by the device or the system) to determine a value corresponding to the sufficiency of the audio to provide reference data for the AED component 295 (e.g., a value representing how good the audio sample will be for training purposes. The value may be based at least in part on various factors such as signal quality, signal length, the appearance of background interfering noise (e.g., speech, unwanted overlapping sound, etc.), number of iterations of the audio data, or the like.

The user device 110b may process the event audio 113 using an AFE component (e.g., the AFE component 324 described herein) to determine event audio data 620. In such embodiments, the event audio data 620 may be acoustic features, such as, a frequency-domain representation of the event audio 113, LBFE values corresponding to the event audio 113, MFCCs corresponding to the event audio 113, etc. In other embodiments, the event audio data 620 may be the audio data generated by the microphone(s) 920 of the user device 110b.

The acoustic event profile component 150 of the system component(s) 120 may process the event audio data 620 using the CRNN 560. The CRNN 560 may already be trained using samples representing a wide range of acoustic events, and may be configured as an encoder for audio data corresponding to a variety of acoustic events. The CRNN 560 may output encoded audio data 622, which is a vector of values, corresponding to the event audio data 620. The encoded audio data 622 may be processed by a profile determination component 630 to determine the acoustic event profile data 582.

The profile determination component 630 may be configured to determine whether additional samples of the custom acoustic event are needed based on the encoded audio data 622 received so far. In some embodiments, the acoustic event profile component 150 may require a predetermined number of samples of the custom acoustic event to be detected. Such predetermined number of samples may need to satisfy certain conditions, such as, audio quality, SNR, intensity, etc. Based on evaluating the received encoded audio data 622, the acoustic event profile component 150 may cause the system component(s) 120 to collect additional event audio 113 representing a potential sample of the custom acoustic event. When enough audio data is gathered, the acoustic event profile component 150 may determine the acoustic event profile data 582 and the threshold 584 for the instant custom acoustic event.

One or more of the points defined by processing the encoded audio data 622 corresponding to the occurrences of the custom acoustic event may be discarded by the profile determination component 630. For example, if two or more points are determined to be relatively near each other in the embedding space, but one or more points are determined to be relatively far away from the two or more relatively near points, the relatively far-away point(s) may not be used when determining the vector data for the acoustic event profile data 582 (e.g., when determining the shape, the center, or the average of the points). For example, the user device 110 may collect event audio for three occurrences of the custom acoustic event, but audio data corresponding to one of the occurrences may include noise (e.g., a car horn honked while the doorbell was ringing). This noisy audio data may be identified by its distance, from the other points, in the embedding space, and therefore discarded.

In other embodiments, if there are at least three items of audio data that represent at least three occurrences of the acoustic event, the acoustic event profile component 150 may determine the shape, average, and/or center of the corresponding points in the embedding space using only two (or other subset) of the points determined from the encoded audio data 622 and then test the result using the third (or other additional) item of audio data. If processing the third item of audio data results in a point corresponding to the shape, average, and/or center determined from the first two items of audio data, the acoustic event profile component 150 may deem that the shape, average, and/or center accurately estimates the occurrence of the custom acoustic event and may be used to generate the acoustic event profile data 582. The acoustic event profile component 150 may further define the shape, average, and/or center using other combinations of subsets of the audio data and test the shape, average, and/or center with other items of audio data. If, for example, a certain combination of items of audio data results in a shape, average, and/or center that fails to process additional items of audio data to determine that those items correspond to the occurrence of the audio event, those combinations and/or items of audio data common to those combinations may be discarded, and the shape, average, and/or center may be determined using remaining instances of the encoded audio data 622.

The event audio data 620 may represent other audio beyond the event audio 113. In certain situations, the system component(s) 120 may be configured to remove the extraneous audio prior to determining the encoded audio data 622 to be used for generating the acoustic event profile data 582. For example, if the system detects speech in the event audio data 620 (for example using a VAD/VAD techniques or other techniques disclosed herein) the system component(s) 120 may remove the portion of the audio data representing the speech, and may only proceed using the event audio data 620 with the speech portion removed.

The profile determination component 630 may determine the acoustic event profile data 582 to be a vector of values determined from processing the encoded audio data 622 corresponding to two or more samples of the event audio 113 for the custom acoustic event. As described above, the profile determination component 630 may evaluate the data points for each sample, determine a shape, a cluster, and/or an average of the data points, and the data points determined to fit the shape/cluster may be included in the acoustic event profile data 582. In other cases, the average of the data points may be included in the acoustic event profile data 582. The vector in the acoustic event profile data 582 may include values in a sequence/order corresponding to time, so that the acoustic event profile data 582 represents how the custom acoustic event is to sound over a duration of time. For example, a particular type of microwave may beep with increasing intensity over a period of 15 seconds, and the acoustic event profile data 582 may represent this information via the sequence/order of values in the vector.

The threshold determination component 640 may determine the threshold 584 for the instant custom acoustic event. In some embodiments, the threshold determination component 640 may process the acoustic event profile data 582 (generated by the profile determination component 630) and/or the encoded audio data 622 corresponding to two or more samples of the custom acoustic event. In some embodiments, the threshold determination component 640 may determine metrics corresponding to the encoded audio data 622. Such metrics may relate to false acceptance rate (FAR), false rejection rate (FRR), etc., and may be used to determine the threshold 584 for the instant custom acoustic event. The FAR and FRR metrics may be determined based on which data points fall outside of the shape/cluster used to determine the acoustic event profile data 582. The threshold determination component 640 may further perform aggregated estimation techniques using random/negative samples (samples other than the instant custom acoustic event samples), may augment the positive samples of the instant custom acoustic event, and may compare the random/negative samples and the positive samples using statistical analysis to determine the metrics and the threshold 584. The determined acoustic event profile data 582 and the corresponding threshold 584 may be stored in the custom AED profile storage 155.

In some embodiments, the CRNN 560 may be fine-tuned/retrained using event audio data 620 corresponding to one or more custom acoustic events taught by the user 105. In such cases, the CRNN 560 may be customized/fine-tuned for the user 105/the user device 110. Such fine-tuning may enable the CRNN 560 to detect custom acoustic events for the user 105 more accurately than another CRNN that may be configured to for another user/set of custom acoustic events. For fine-tuning, training data may include multiple instances of event audio data 620, and the trained CRNN may be tested against the acoustic event profile data 582, for the custom acoustic events represented in the training data, to determine accuracy of the trained CRNN. In such embodiments, the fined-tuned/retrained CRNN 560 may be included in the AED component 295 for the user device 110.

In some embodiments, the CRNN 560 may be updated/retrained and/or the custom AED profile storage 155 may be updated based on feedback received from the user 105 when the user device 110 detects custom acoustic events (as described in relation to FIG. 2D). The user device 110 (or another device) may output a notification of a custom acoustic event being detected, however, the user 105 may provide feedback (e.g., via a spoken input, touch input, gesture, etc.) that the custom acoustic event did not in fact occur, the notification is incorrect, the user did not want to be notified of this event, etc; Using such feedback, the system component(s) 120 may update the CRNN 560, the acoustic event profile data 582, and/or the threshold 584.

In some embodiments, the CRNN 560 may be updated/retrained and/or the custom AED profile storage 155 may be updated based on type of acoustic event or type of the source of the acoustic event. Some acoustic event sources may be dynamic and may change over time, while other acoustic event sources may be static and may not change. For example, a bark by a puppy is likely to have a different bark than the same dog as an adult. Based on the expected changes in the acoustic event source, the system component(s) 120 may prompt the user or initiate retraining and/or updating of data. For example, for natural language description "puppy bark" for an acoustic event, the system component(s) 120 may prompt retraining/updating at a time in the future (e.g., every 4 weeks for the next couple of months) to update at least the acoustic event profile data 582, so that a bark by the same dog is detected by the system component(s) 120 while the dog grows. The system component(s) 120 may prompt retraining on a periodic basis for a time period or until the event audio, captured in the user's environment, does not change significantly for a given time period (e.g., the dog has reached an adult age).

In some embodiments, the user 105 may wish to configure the user device 110 to perform one or more "if-then" determinations based on two or more custom acoustic events. For example, the user 105 may not wish to be notified every time the user device 110 detects that a microwave beeps; instead, the user may wish that the user device 110 determines that, upon detection of the microwave beeping, it will send data to a second user device notifying the user 105 of the beeping only if it does not detect the sound of the door of the microwave opening and/or closing within a period of time after detection of the beeping (e.g., five minutes). The user 105 may speak an utterance specifying this condition and/or the system component(s) 120 may determine that such a condition is likely (e.g., determining that the first acoustic event corresponds to a timer expiring and cause output, by the user device 110, of a prompt requesting the user 105 to cause occurrence of the second custom acoustic event (upon which the first custom acoustic event is dependent/conditioned on).

Figure 7:
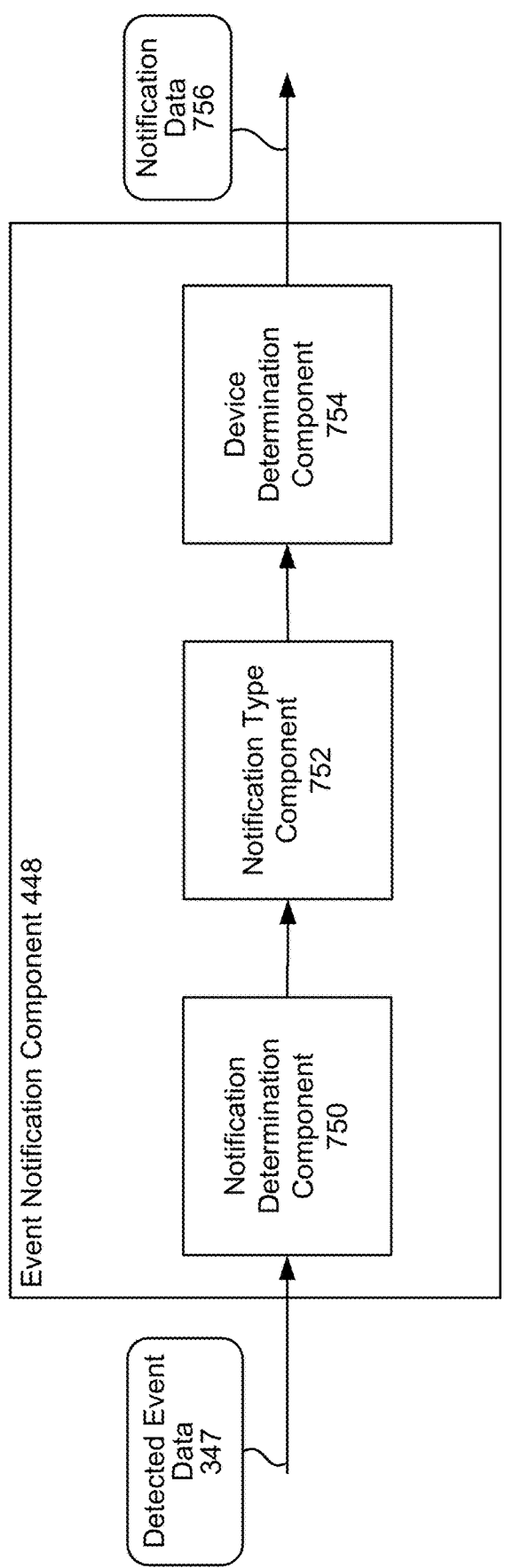
FIG. 7 illustrates an event-notification component according to embodiments of the present disclosure.
Figure 8:
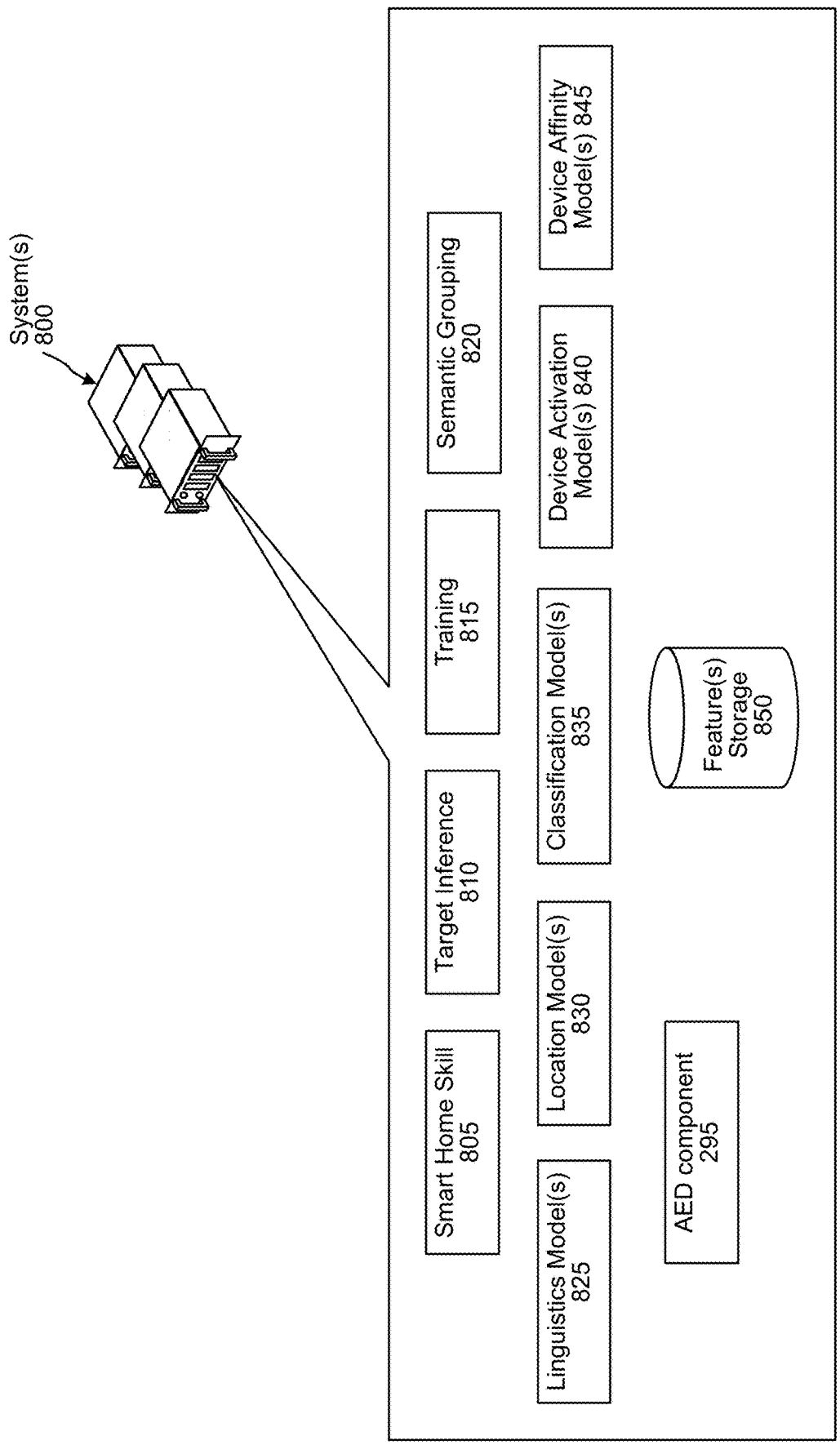
FIG. 8 is a conceptual diagram of components of a system for processing user inputs relating to smart home devices, according to embodiments of the present disclosure.

FIG. 7 illustrates example components of the notification system component(s) 121. As shown in FIG. 7, the event notification component 448 may include a notification-determination component 750, a notification-type component 752, and/or a device-determination component 754. The notification-determination component 750 may receive one or more of the detected event data 347 and determine if a notification corresponding to the event(s) should be sent to one or more device(s). The detected event data 347 may, for example, indicate a first kind of event, such as glass breaking or a baby crying, and the notification-determination component 750 may determine that a corresponding notification should be sent to a user device. The detected event data 347 may, on the other hand, indicate a second kind of event, such as a dog bark, and the notification-determination component 750 may determine that no notification may be sent. The notification-determination component 750 may make this determination by determining data identifying the event and determining a corresponding user preference (as stored in, for example, the profile storage 270/370) for receiving notifications corresponding to the event. That is, a user of the user device 110 may have input a preference for receiving a notification corresponding to a particular event, and the notification-determination component 750 may determine to send a notification based on the preference. In some embodiments, the notification-determination component 750 determines whether or not to send a notification based at least in part on the type of the event. For example, if the event corresponds to a potentially dangerous or rare event, such as glass breaking, the notification-determination component 750 may determine to send the notification.

The notification-type component 752 may determine the type of the notification to be sent. Types of notifications may include text messages, emails, phone calls, push notifications, or other such notifications. Like the notification-determination component 750, the notification-type component 752 may determine the type of the notification based on a user preference stored in the profile storage 270/370. The notification-type component 752 may similarly determine the type of the notification based on the type of the event, wherein potentially dangerous or rare events may correspond to a first type of notification, such as a phone call, while other types of events may correspond to a second type of notification, such as an email.

A device-determination component 754 may determine which of a potential plurality of user devices should receive the notification(s). In some embodiments, the device-determination component 754 may determine that the notification(s) (e.g., notification data 756) are to be sent to every device associated with a user account stored in the profile storage 270/370. In other embodiments, the device-determination component 754 determines that the notification(s) are to be send to a subset of the devices. For example, for one event (e.g., a high priority event) a user may indicate that every device associated with the user profile be notified if the event is detected. In another example, for a different event (e.g., a low priority event) a user may indicate that only a single specific device associated with the user profile be notified if the event is detected. In another example, a user may indicate that another device outside the user profile be notified if an event is detected (e.g., if a toilet running is detected send a notification to a device/telephone number associated with a plumber).

The system 100 may be used to create various acoustic event detection data for different events as detectable by different devices in different locations. For example, for a same acoustic event, the system may prompt the user to walk through audio capture by several different devices (for example one device in the living room, one device in the kitchen, etc.). The system 100 may instruct the user to cause the event and may capture acoustic data from multiple different devices while the event occurs. The system 100 may use this combined information to form one set of AED configuration data that may be used by multiple devices (e.g., jointly trained AED data goes to each device). Alternatively (or in addition) the system 100 may use the audio data from each device to train different AED configuration data for the different devices. For example, the audio data captured by the kitchen device may be used to train AED configuration data to be used by the kitchen device and audio data captured by a living room device may be used to train AED configuration data to be used by the living room device, thus resulting in two different trained AED models even though they are trained to detect the same acoustic event, albeit from different locations (and potentially different devices).

The system 100 may also be used to create various acoustic event detection data for the same as detectable by a same device, though if the event occurs in a different location relative to the detecting device. For example, to a device in a kitchen an electronic toy left on may sound different when the toy is in the living room as opposed the toy being in the dining room (depending, of course, on home acoustics, properties of the sound, properties of the detecting device, etc.). In such a situation the system may create one set of AED configuration data (e.g., trained AED model) for the acoustic event from a first location and another set of AED configuration data (e.g., trained AED model) for the acoustic event from a second location different from the first location. To do so the system may need to go through the training/prompting steps for each location and then may capture respective audio data corresponding to the respective location in order to train the separate AED model(s). The AED model(s) may then be loaded onto a user device 110 which, when it attempts to detect a future event, may operate both AED model(s). Thus, if a particular model is used to detect the event, the user device 110 may also be able to output an indication of a location of a source of the event based on which AED model was used to recognize the event. For example, if an AED model corresponding to an acoustic event originating in location A (e.g., the living) results in a higher confidence than an AED model corresponding to the same acoustic event originating in location B (e.g., the dining room), the user device 110 may output an indication that the event was detected in location A.

In certain configurations, if the user replaces a user device 110*a* at a particular location, the user may indicate to the system that the new user device 110*b* will be located at the same location. The system may then send the appropriate AED configuration data (e.g., AED model(s)) to the new user device 110*b* so the new user device 110*b* can be configured to recognize the same custom acoustic events as the prior/replaced user device 110*a*.

A physical location (e.g., a primary residence, a vacation home, a rental property, a hotel, an office, or other physical space, etc.) may include a variety of smart home devices. As used herein, a "smart home device" refers to a computing device that is capable of being controlled using speech, among other things. Example smart home devices include, but are not limited to, light switches, light bulbs, plugs, thermostats, door locks, microwaves, toasters, ovens, coffee makers, faucets, dishwashers, laundry machines (washers and dryers), televisions, and speakers. One or more of the user devices 110, associated with the user profile of the user 105, may be a smart home device.

FIG. 8 is a conceptual diagram of components of a system(s) 800 for processing user inputs relating to smart home devices. For example, the user 105 may provide a spoken input relating to a smart home device, the system component(s) 120 may process the spoken input, and the system component(s) 120 may send data relating to the spoken input to the system(s) 800 for further processing. The system(s) 800 may process with respect to the spoken input (as described below) and may cause a smart home user device 110 to operate accordingly.

The system(s) 800 may also be used to control smart home devices in response to occurrence of certain acoustic events. For example, the system component(s) 120 may receive event audio from the user device 110*b*, may determine that the event audio represents footsteps, and may send, to the system(s) 800, data indicating that event audio representing footsteps is detected by the user device 110*b*. In response to receiving the data from the system component(s) 120, the system(s) 800 may cause a smart light to turn on, where the smart light may be located near/proximate to the user device 110*b*. As another example, in response to receiving the data, from the system component(s) 120, indicating footsteps are detected, the system(s) 800 may cause a user device 110*d* to generate an alert, when the user device 110*d* is in an "armed" mode.

The system(s) 800 may include a smart home skill 805, a target inference component 810, a training component 815, a semantic grouping component 820, one or more linguistics models 825, one or more location models 830, one or more classification models 835, one or more device activation models 840, one or more device affinity models 845, the AED component 295, and a feature(s) storage 850.

The smart home skill 805 may be one of the skill components 290/390 and may be configured to receive NLU output data and attempt to determine which user device 110 is to be controlled. In some instances, the smart home skill 805 may determine more than one user device 110 may correspond to a device to be controlled. In such an example, the smart home skill 805 may call or otherwise request the target inference component 810 perform target device resolution.

The target inference component 810 may use data stored in the profile storage 270/370 and/or from audio data representing the spoken input along with one or more models to determine which user device 110 should be acted upon. For example, the target inference component 810 may receive data from one or more sources as input into a classification model(s) 835 for determining which user device 110 should be acted upon in light of device identifying information in the spoken natural language input. The data may include, for example, names of the user devices 110 associated with the device that received the spoken input, device-state data indicating historical activation and deactivation of the user devices 110, prior-request data indicating which user devices 110 were activated and/or deactivated recently, device affinity data indicating frequencies at which user devices 110 are controlled by speech controllable devices, current device state data indicating the state of user devices 110 at or near the time the spoken natural language input was received, and/or the audio data representing the spoken natural language input.

The one or more models may be configured to use some or all of this data to generate features for input into the classification model(s) 835. For example, the linguistics model(s) 825 may use the device identifying information from the spoken input and the names of the user devices 110 to determine semantic similarities for some or all device identifying information/name pairs. The features generated by the linguistics model(s) 825 may include semantic-similarity scores for some or all of the pairs, with the most favorable score being associated with the device name that was determined by the linguistic model(s) 825 to be most semantically similar to the device identifying information from the spoken natural language input. For example, the linguistics model(s) 825 may determine "study light" to have a more favorable similarity score with respect to "office light" than "kitchen light" because "study" and "office" are more semantically similar than "study" and "kitchen." These features may be configured to be input include the classification model(s) 835 and/or may be stored in the feature(s) storage 850 for use by the classification model(s) 835.

As to the linguistics model(s) 825, machine learning techniques may be used to generate models that extract and/or use extracted names associated with the user devices 110 and calculate semantic similarities between the names and the device identifying information from the spoken natural language input. A device pair may be identified, determined, and/or generated for each pair of devices identifying information and user device 110. For example, a first pair may correspond to a user device 110a and the device identifying information, a second pair may correspond to a second user device 110b and the device identifying information, a third pair may correspond to a third user device 110c and the device identifying information, etc. The names associated with the user devices 110 may be analyzed with respect to the device identifying information, using the linguistics model(s) 825, to determine a probability score for each pair.

In addition to, or instead of, using the linguistics model(s) 825, the system(s) 800 may use the device activation model(s) 840 to perform target device resolution, By way of example, the device activation model(s) 840 may use the device-state data and/or the spoken natural language input data to determine probabilities that the user devices 110 are operated at the time when the spoken natural language input is received. A probability may be determined for some or all of the user devices 110 associated with the speech controllable device that received the spoken input. The features generated by the device activation model(s) 840 may include device activation scores for some or all of the user devices 110, with the most favorable score being associated with the user device 110 that is most frequently operated during the time and/or within a time range that includes the time at which the spoken input was received.

For example, it may be determined that at or near a certain time of the day and/or day of the week, such as weekdays at 2:00 pm for example, a user device 110a with the name "office light" is activated frequently. If a spoken input is received by the system component(s) 120 at, for example, 2:04 pm, the device activation model(s) 840 may determine that a higher probability exists that the "office light" device is the device to be acted upon rather than, for example, a "bedroom light" device, which is operated less frequently at or around 2:00 pm. These features may be configured to be input include the classification model(s) 835 and/or may be stored in the feature(s) storage 850 for use by the classification model(s) 835.

As to the device activation model(s) 840, rules-based and/or machine learning techniques may be used to generate models that extract and/or use timing information associated with when a user device 110 is turned on and/or turned off. The device activation model(s) 840 may be configured to receive timing data. The timing data may be used to determine when user devices 110 are turned on and/or turned off. A threshold degree of usage similarity may be identified and/or determined and may be used to analyze whether a given device has a usage frequency that meets or exceeds the threshold degree of usage similarity.

In addition to, or instead of, using the linguistics model(s) 825 and/or the device activation model(s) 840, the system(s) 800 may use the device affinity model(s) 845 to perform target device resolution. By way of example, the device affinity model(s) 845 may use device affinity data to determine frequencies at which user devices 110 are operated by speech controllable devices. For example, some user devices 110 may be operated more frequently by one speech controllable device over another speech controllable device, such as user devices 110 in an office being operated more frequently by a speech controllable device situated in the office. A frequency and/or score indicating how frequent some or all of the user devices 110 are used by some or all of the speech controllable user devices 110 may be determined by the device affinity model(s) 845. The features generated by the device affinity model(s) 845 may include device affinity scores, with the most favorable score being associated with the user device 110 that is most frequently operated by the speech controllable device from which the spoken natural language input was received. These features may be configured to be input into the classification model(s) 835 and/or may be stored in the feature(s) storage 850 for use by the classification model(s) 835.

As to the device affinity model(s) 845, rules-based and/or machine learning techniques may be used to generate models that extract and/or use device affinity information associated with a frequency at which a user device 110 is caused to operate by given speech controllable devices. For example, a physical location may include two or more speech controllable devices, for example one in an office and one in a bedroom. The office speech controllable device may be frequently used to operate certain user devices 110, whereas the bedroom speech controllable device may be frequently used to operate other user devices 110. The device affinity model(s) 845 may determine a frequency at which such speech controllable devices are used to operate the user devices 110. For example, device affinity data may be received by the device affinity model(s) 845 for identifying which user devices 110 are operated by which speech controllable devices and frequencies associated with such operations.

A control rate may be identified for each pair of speech controllable device and user device 110. For example, a control rate of 0.9 may be determined for the interaction of a user device 110 with a first speech controllable device, a control rate of 0.1 may be determined for the interaction of the user device 110 with a second speech controllable device, a control rate of 0.8 may be determined for the interaction of a second user device 110 with the first speech controllable device, a control rate of 0.2 may be determined for the interaction of the second user device 110 with the second speech controllable device, etc. In this example, the device affinity model(s) 845 may determine that the first device and the second device are frequently controlled by the first speech controllable device, making those devices candidates for target device resolution when the spoken natural language input is received from the first speech controllable device. In examples, a threshold control rate may be established and may be used to determine if a user device 110 is controlled by a particular speech controllable device with enough frequency to make the user device 110 a candidate for target device resolution.

In addition to, or instead of, using the linguistics model(s) 825 and/or the device activation model(s) 840 and/or the device affinity model(s) 845, the system(s) 800 may use the location model(s) 830 to perform target device resolution. For example, the location model(s) 830 may use the device identifying information from the spoken natural language input to determine if the device identifying information corresponds to an environment naming, such as "kitchen," "office," "living room," etc. The features generated by the location model(s) 830 may include confidence scores associated with environment names, with the most favorable score being associated with the environment name that most closely corresponds to the device identifying information. For example, if the spoken natural language input includes "turn on the kitchen lights," the location model(s) 830 may identify "kitchen" as the device identifying information and may use that information to determine which user device 110 associated with the "kitchen" and/or with a name of "kitchen" is most likely to correspond to "kitchen lights" from the spoken natural language input. Additionally, or alternatively, the location model(s) 830 may be configured to receive weather data indicating weather conditions at or near a location where the speech controllable device and/or the user devices 110 are situated. The weather data may be used to determine, for example, lighting conditions at the location and/or within a given space. For example, in instances where the weather data indicates that it is currently sunny and 95 degrees at the location, it may be less likely that the spoken natural language input corresponds to a request to turn on lights in a living room area. For further example, in instances where the weather data indicates it is currently cloudy and/or rainy, it may be more likely that the spoken natural language input corresponds to a request to turn on lights in a living room area.

Additionally, or alternatively, the system(s) 800 may be configured to use prior request data to generate features that include prior request scores. For example, multiple user devices 110 may be associated with a speech controllable device, and the prior request data may indicate a time at which a given user device 110 was operated in response to a spoken natural language input. The user device 110 that was operated closest in time to when the spoken natural language input was received may be more likely to correspond to the target device than other user devices 110. For example, a previous spoken natural language input may have been "turn on bedroom light." Thereafter, another spoken natural language input received 10 minutes later may be "turn off light." The prior request data may indicate the time at which the bedroom light was turned on, and upon receiving the spoken natural language input of "turn off light," the system(s) 800 may determine a prior request score as a feature for input into the classification model(s) 835.

Additionally, or alternatively, the system(s) 800 may be configured to use current device state to generate features that include device state scores. For example, user devices 110 may be associated with states, such as "on," "off;" "idle," "active," etc. A spoken input may include "turn off the light." In this example, the intent may be to deactivate or otherwise turn off a user device 110, but device identifying information was not provided in the spoken input. However, only a portion or only one user device 110 may be in a state that is "on" or similar, and this information can be used by the system(s) 800 to determine that other user devices 110 that are already in an "off" state are not likely candidates for target device resolution. Device state scores may be determined by the system(s) 800 as features for input into the classification model(s) 835.

Additionally, or alternatively, the semantic grouping component 820 may be configured to use the device identifying information from the spoken natural language input to determine semantic similarities and affinities to identify the user device 110 most likely to correspond to the device identifying information, even in instances where the name for the user device 110 has not been setup by the user and/or is associated with a default name, such as "light A," for example. For example, a spoken natural language input may include "turn on cooking lights," but the speech controllable device, that received the spoken natural language input, is not associated with a user device 110 with the name of "cooking lights." The semantic grouping component 820 may determine a semantic similarity between the word "cooking" and one or more words from names typically used for user devices 110. For example, the system(s) 800 may determine that "cooking" is semantically similar to "kitchen." The system(s) 800 may then determine similarities between the semantically-similar word, here "kitchen," and device group names and/or names for speech controllable devices.

For example, the user may have assigned or otherwise selected "kitchen" as a name for a device group that includes user devices 110 located in the kitchen associated with the user, and/or the user may have assigned or otherwise selected "kitchen" as a name for the speech controllable device. Additionally, or alternatively, usage data aggregated from use of speech controllable devices in one or more other spaces may be used to determine that "cooking light" frequently refers to a user device 110 with a "light" device type that is generally given a name with the word "kitchen." Some or all of this information may be used by the semantic grouping component 820 to determine that the user device 110 with the default name "light A," which is associated with the "kitchen" device group, and/or is associated with the "kitchen" speech controllable device, and/or that is associated with the usage data may be given the name "kitchen light," and may be acted upon in response to the spoken natural language input "turn on cooking light."

The features generated by the linguistics model(s) 825, the device activation model(s) 840, the device affinity model(s) 845, the location model(s) 830, and/or the semantic grouping component 820 may be stored, in examples, in a feature(s) storage 850 and may be retrieved by the classification model(s) 835 to perform target device resolution. For example, device affinity scores may be predetermined before the spoken natural language input is received, and the corresponding features may be stored in the feature(s) storage 850.

In examples, the target inference component 810 may be unable to determine which user device 110 should be acted upon in light of the spoken natural language input and/or may be able to determine which user device 110 should be acted upon below a threshold confidence level. In these and other examples, the process may default to identifying the user device 110 using Levenshtein distances. Levenshtein distances may include a string metric for measuring the distance between two sequences. For example, the Levenshtein distance between two words is the minimum number of single-character edits required to change one word into the other. These techniques may be used to determine the Levenshtein distance between device identifying information from the spoken natural language input and names associated with user devices 110, with the shortest Levenshtein distance indicating the names to be selected by the system(s) 800.

Based at least in part on the features as described herein, the classification model(s) 835 may determine which device(s) 110 is most likely to correspond to the device(s) intended to be acted upon. For example, the classification model(s) 835 may generate output data representing a ranked list of the user devices 110, with the highest ranking user device 110 being the most likely device to be acted upon. The target inference component 810 may provide the name and/or device identifier of the highest ranking user device 110 to the smart home skill 805, for example, to generate directive data. The directive data may represent a directive for the speech controllable device and/or other components of the system(s) 800 to perform a directive, such as activation and/or deactivation, on the highest-ranking user device 110. Additionally, or alternatively, the TTS component 280/380 may generate audio data representing a request for the user of the speech controllable device to confirm that the identified user device 110 is the device the user intended for the system(s) 800 to act upon. Audio data representing the response of the user may be received at the system component 120 for processing, and if the response confirms that the user device 110 was selected accurately by the system(s) 800, the directive data may be sent to the speech controllable device.

Additionally, or alternatively, user responses to the target device resolution processes described herein may be used by the training component 815 to train the one or more models of the system(s) 800 and/or to generate new models to be used for target device resolution. The training component 815 may receive feedback data representing an indication that the target device corresponds to a given user device 110 and may generate, based at least in part on the feedback data, training data representing the indication as a target attribute. The training component 815 may determine an association between the target attribute and at least one of the features or at least a portion of intent data as generated by the NLU component 260/360, and may generate, based at least in part on the association, a new classification model(s) to be used in place of the previous classification model(s) 835.

Figure 9:
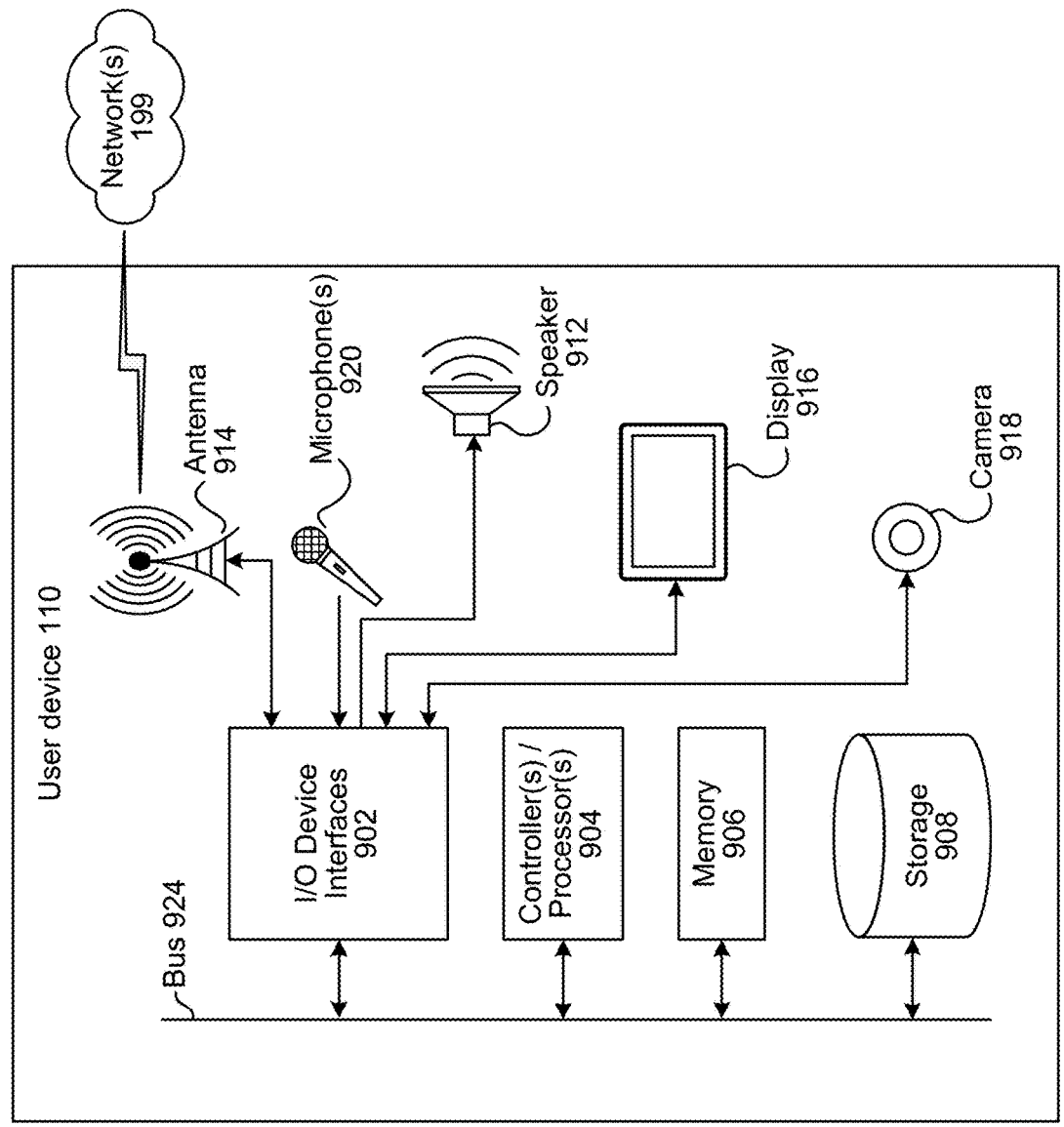
FIG. 9 is a block diagram conceptually illustrating example components of a device, according to embodiments of the present disclosure.
Figure 10:
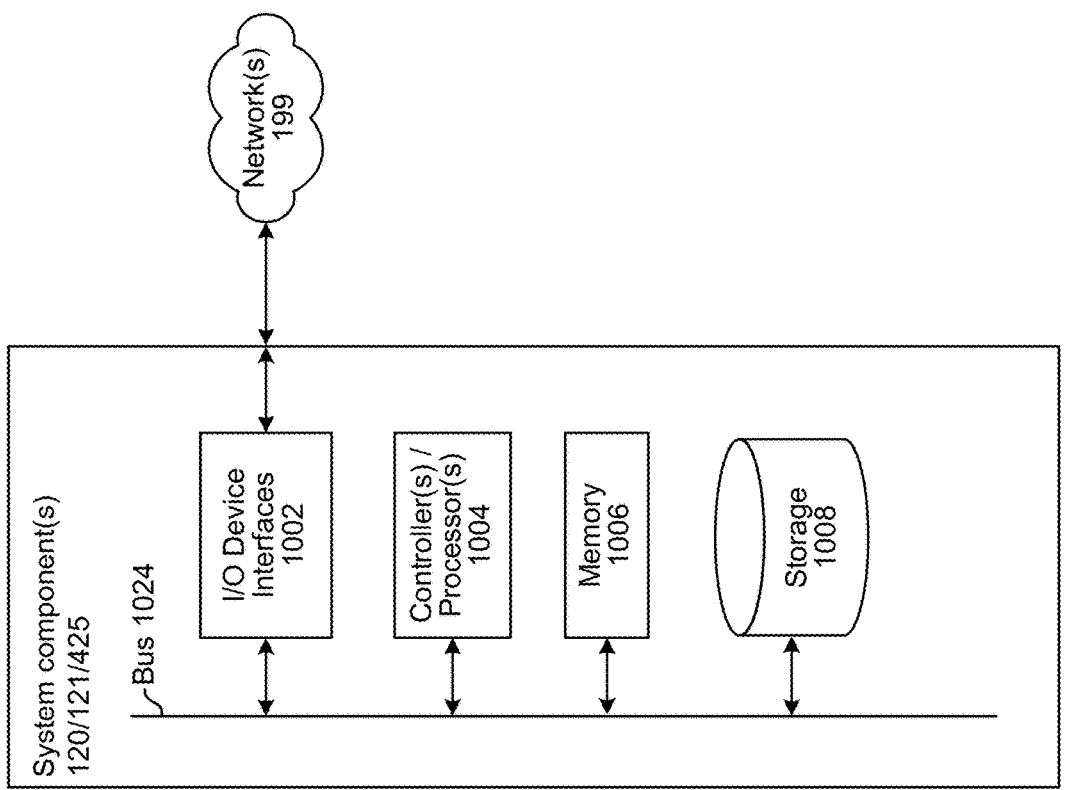
FIG. 10 is a block diagram conceptually illustrating example components of a system, according to embodiments of the present disclosure.

FIG. 9 is a block diagram conceptually illustrating a user device 110 of the system 100. FIG. 10 is a block diagram conceptually illustrating example components of a remote device, such as the system component(s) 120, the notification system component(s) 121, the system(s) 800 and the skill support system component(s) 425, A system (120/121/425/800) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/121/425/800) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/121/425/800) may be included in the system 100 of the present disclosure, such as, one or more system components 120, one or more notification system components 121, one or more systems 800 and/or one or more skill support system components 425. In operation, each of these systems may include computer-readable and computer-executable instructions that reside on the respective device (120/121/425/800), as will be discussed further below.

Each of these system components (110/120/121/425/800) may include one or more controllers/processors (904/1004), which may each include a central processing unit (CPU) for processing data and computer-readable instructions, and a memory (906/1006) for storing data and instructions of the respective device. The memories (906/1006) may individually include volatile random access memory (RAM), non-volatile read only memory (ROM), non-volatile magnetoresistive memory (MRAM), and/or other types of memory. Each device (110/120/121/425) may also include a data storage component (908/1008) for storing data and controller/processor-executable instructions. Each data storage component (908/1008) may individually include one or more non-volatile storage types such as magnetic storage, optical storage, solid-state storage, etc. Each device (110/120/121/425) may also be connected to removable or external non-volatile memory and/or storage (such as a removable memory card, memory key drive, networked storage, etc.) through respective input/output device interfaces (902/1002).

Computer instructions for operating each system component (110/120/121/425/800) and its various components may be executed by the respective device's controller(s)/processor(s) (904/1004), using the memory (906/1006) as temporary "working" storage at runtime. A device's computer instructions may be stored in a non-transitory manner in non-volatile memory (906/1006), storage (908/1008), or an external device(s). Alternatively, some or all of the executable instructions may be embedded in hardware or firmware on the respective device in addition to or instead of software.

Each system component (110/120/121/425/800) includes input/output device interfaces (902/1002). A variety of components may be connected through the input/output device interfaces (902/1002), as will be discussed further below. Additionally, each device (110/120/121/425) may include an address/data bus (924/1024) for conveying data among components of the respective device. Each component within a system component (110/120/121/425/800) may also be directly connected to other components in addition to (or instead of) being connected to other components across the bus (924/1024).

Referring to FIG. 9, the user device 110 may include input/output device interfaces 902 that connect to a variety of components such as an audio output component such as a speaker 912, a wired headset or a wireless headset (not illustrated), or other component capable of outputting audio. The user device 110 may also include an audio capture component. The audio capture component may be, for example, a microphone 920 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The user device 110 may additionally include a display 916 for displaying content. The user device 110 may further include a camera 918.

Via antenna(s) 914, the input/output device interfaces 902 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (902/1002) may also include communication components that allow data to be exchanged between devices such as different physical servers in a collection of servers or other components.

The components of the user device 110, the system component(s) 120, the system(s) 800, and/or skill support system component 425 may include their own dedicated processors, memory, and/or storage. Alternatively, one or more of the components of the user device 110, the system component(s) 120, and/or skill support system component 425 may utilize the I/O interfaces (902/1002), processor(s) (904/1004), memory (906/1006), and/or storage (908/1008) of the user device 110, the system component(s) 120, the notification system component(s) 121, the system component(s) 120, the system(s) 800 and/or skill support system component 425, respectively.

As noted above, multiple devices may be employed in a single system. In such a multi-device system, each of the devices may include different components for performing different aspects of the system's processing. The multiple devices may include overlapping components. The components of the user device 110, the system component(s) 120, the system(s) 800, and the skill support system component 425, as described herein, are illustrative, and may be located as a stand-alone device or may be included, in whole or in part, as a component of a larger device or system.

Figure 11:
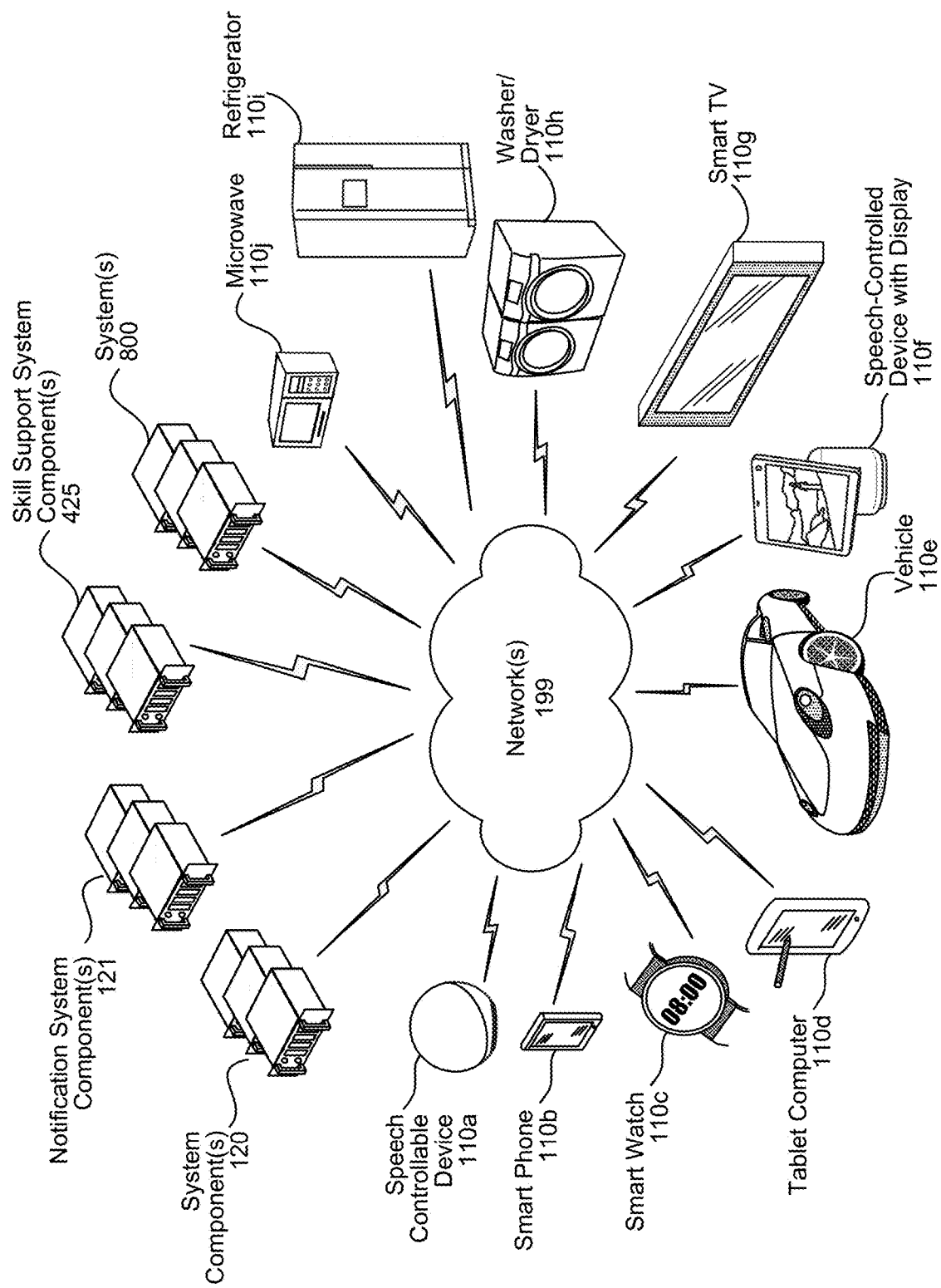
FIG. 11 illustrates an example of a computer network for use with the overall system, according to embodiments of the present disclosure.

As illustrated in FIG. 11, multiple devices (110a-110j, 120, 121, 425, 800) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable user device 110a, a smart phone 110b, a smart watch 110c, a tablet computer 110d, a vehicle 110e, a speech-controllable display user device 110f, a smart television 110g, a washer/dryer 110h, a refrigerator 110i, and/or a microwave 110j may be connected to the network(s) 199 through a wireless service provider, over a Wi-Fi or cellular network connection, or the like. Other devices are included as network-connected support devices, such as the system component(s) 120, the notification system component(s) 121, the system component(s) 120, the system(s) 800, the skill support system component 425, and/or others. The support devices may connect to the network(s) 199 through a wired connection or wireless connection.

The concepts disclosed herein may be applied within a number of different devices and computer systems, including, for example, general-purpose computing systems, speech-processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:

receiving first user input data representing a first natural language description of a first acoustic event to be detected by a system;

processing the first user input data using a first text encoding component to generate a first vector representing a first semantic embedding of the first natural language description;

calculating a first cosine similarity between the first vector and a second vector, the second vector corresponding to a second semantic embedding of a second natural language description of a first sound;

determining, based on the first cosine similarity, a second vector that is similar to the first vector;

causing a user device to output the first sound and a request for confirmation that the first sound corresponds to the first acoustic event;

receiving a second user input indicating that the first sound corresponds to the first acoustic event; and in response to the second user input confirming that the first sound corresponds to the first acoustic event, generating a first custom event profile including the first vector and a third vector representing a first audio embedding of the first sound.

2. The computer-implemented method of claim 1, further comprising:
- receiving first audio data;
- processing the first audio data with a first audio encoding component to generate a fourth vector representing a second audio embedding;
- determining a second cosine similarity between the fourth vector and the third vector;
- determining that the second cosine similarity meets a first similarity threshold;
- in response to determining that the second cosine similarity meets the first similarity threshold, causing the user device to output the first audio data and a request for confirmation that the first audio data corresponds to the first acoustic event;
- receiving a third user input indicating that the first audio data corresponds to the first acoustic event;
- in response to the third user input, generating a fifth vector using the fourth vector and the third vector, the fifth vector having a greater similarity to the fourth vector than the third vector;
- determining a second similarity threshold representing a greater threshold similarity than the first similarity threshold; and
- generating a second custom event profile including the first vector, the fifth vector, and the second similarity threshold, the second custom event profile representing an update of the first custom event profile.

3. The computer-implemented method of claim 2, further comprising:
- generating first update data representing first gradients calculated using the fourth vector and the third vector;
- generating second update data representing second gradients calculated using the first audio encoding component;
- sending the first update data and second update data to a system component;
- receiving, from the system component, third update data;
- generating, using the third update data, a second audio encoding component representing an update of the first audio encoding component; and
- generating, using the third update data, a third custom event profile representing an update of the second custom event profile.

4. The computer-implemented method of claim 1, further comprising:
- receiving first audio data;
- processing the first audio data with a first audio encoding component to generate a fourth vector representing a second audio embedding,
- determining a second cosine similarity between the fourth vector and the third vector;
- determining that the second cosine similarity meets a first similarity threshold;
- in response to determining that the second cosine similarity meets the first similarity threshold, causing the user device to output the first audio data and a request for confirmation that the first audio data corresponds to the first acoustic event;
- receiving a third user input indicating that the first audio data does not correspond to the first acoustic event,
- in response to the third user input, generating a fifth vector using the fourth vector and the third vector, the fifth vector having a greater dissimilarity to the fourth vector than the third vector;
- determining a second similarity threshold representing a lesser threshold similarity than the first similarity threshold; and
- generating a second custom event profile including the first vector, the fifth vector, and the second similarity threshold, the second custom event profile representing an update of the first custom event profile.

5. A computer-implemented method comprising:
- receiving first user input data representing a first natural language description of a first acoustic event to be detected by a system;
- generating first data representing a first semantic embedding of the first natural language description;
- identifying, using the first data, second data corresponding to a second semantic embedding of a second natural language description of a first sound;
- causing a user device to output the first sound;
- receiving a second user input indicating that the first sound corresponds to the first acoustic event; and
- in response to the second user input, generating a first custom event profile including the first data and first embedding data representing first audio features of the first sound.

6. The computer-implemented method of claim 5, further comprising:
- receiving first audio data;
- generating second embedding data representing second audio features of the first audio data;
- determining a first similarity between the first embedding data and the second embedding data;
- determining that the first similarity satisfies a first condition;
- in response to determining that the first similarity satisfies the first condition, causing the user device to output the first audio data;
- receiving a third user input indicating that the first audio data corresponds to the first acoustic event;
- in response to the third user input, generating third embedding data using the first embedding data and the second embedding data, the third embedding data having a greater similarity to the second embedding data than the first embedding data; and
- generating a second custom event profile including the first data and the third embedding data, the second custom event profile representing an update of the first custom event profile.

7. The computer-implemented method of claim 6, further comprising:
- receiving second audio data;
- generating fourth embedding data representing third audio features of the second audio data;
- determining a second similarity between the third embedding data and the fourth embedding data; and
- based on the second similarity, causing the user device to output a notification that an event corresponding to the first natural language description has been detected.

8. The computer-implemented method of claim 6, further comprising:
- in response to the third user input, determining a second condition, the second condition requiring a greater similarity than the first condition; and
- associating the second custom event profile with the second condition.

9. The computer-implemented method of claim 6, further comprising:
   generating first update data representing first gradients calculated using the first embedding data and the second embedding data;
   sending the first update data to a system component;
   receiving, from the system component, second update data; and
   generating, using the second update data, a third custom event profile representing an update of the second custom event profile.

10. The computer-implemented method of claim 5, further comprising:
    receiving first audio data;
    generating second embedding data representing second audio features of the first audio data;
    determining a first similarity between the first embedding data and the second embedding data;
    determining that the first similarity satisfies a first condition;
    in response to determining that the first similarity satisfies the first condition, causing the user device to output the first audio data;
    receiving a third user input indicating that the first audio data corresponds to the first acoustic event;
    in response to the third user input, generating third embedding data using the first embedding data and the second embedding data, the third embedding data having a greater dissimilarity to the second embedding data than the first embedding data; and
    generating a second custom event profile including the first data and the third embedding data, the second custom event profile representing an update of the first custom event profile.

11. The computer-implemented method of claim 10, further comprising:
    in response to the third user input, determining a second condition, the second condition requiring less similarity than the first condition; and
    associating the second custom event profile with the second condition.

12. The computer-implemented method of claim 5, further comprising:
    receiving first audio data,
    generating second embedding data representing second audio features of the first audio data;
    determining a similarity between the first embedding data and the second embedding data;
    determining that the similarity satisfies a condition associated with the first custom event profile; and
    in response to determining that the similarity satisfies the condition, causing the user device to output a notification that an event corresponding to the first natural language description has been detected.

13. A system comprising:
    at least one processor; and
    at least one memory including instructions that, when executed by the at least one processor, cause the system to:
       receive first user input data representing a first natural language description of a first acoustic event to be detected by a system;
       generate first data representing a first semantic embedding of the first natural language description;
       identify, using the first data, second data corresponding to a second semantic embedding of a second natural language description of a first sound;
       cause a user device to output the first sound;
       receive a second user input indicating that the first sound corresponds to the first acoustic event; and
       in response to the second user input, generate a first custom event profile including the first data and first embedding data representing first audio features of the first sound.

14. The system of claim 13, wherein the at least one memory includes further instructions that, when executed by the at least one processor, further cause the system to:
    receive first audio data;
    generate second embedding data representing second audio features of the first audio data;
    determine a first similarity between the first embedding data and the second embedding data;
    determine that the first similarity satisfies a first condition;
    in response to determining that the first similarity satisfies the first condition, cause the user device to output the first audio data;
    receive a third user input indicating that the first audio data corresponds to the first acoustic event;
    in response to the third user input, generate third embedding data using the first embedding data and the second embedding data, the third embedding data having a greater similarity to the second embedding data than the first embedding data; and
    generate a second custom event profile including the first data and the third embedding data, the second custom event profile representing an update of the first custom event profile.

15. The system of claim 14, wherein the at least one memory includes further instructions that, when executed by the at least one processor, further cause the system to:
    receive second audio data;
    generate fourth embedding data representing third audio features of the second audio data;
    determine a second similarity between the third embedding data and the fourth embedding data; and
    based on the second similarity, cause the user device to output a notification that an event corresponding to the first natural language description has been detected.

16. The system of claim 14, wherein the at least one memory includes further instructions that, when executed by the at least one processor, further cause the system to:
    in response to the third user input, determine a second condition, the second condition requiring a greater similarity than the first condition; and
    associate the second custom event profile with the second condition.

17. The system of claim 14, wherein the at least one memory includes further instructions that, when executed by the at least one processor, further cause the system to:
    generate first update data representing first gradients calculated using the first embedding data and the second embedding data;
    send the first update data to a system component;
    receive, from the system component, second update data; and
    generate, using the second update data, a third custom event profile representing an update of the second custom event profile.

18. The system of claim 13, wherein the at least one memory includes further instructions that, when executed by the at least one processor, further cause the system to:
    receive first audio data;
    generate second embedding data representing second audio features of the first audio data;

determine a first similarity between the first embedding data and the second embedding data;

determine that the first similarity satisfies a first condition;

in response to determining that the first similarity satisfies the first condition, cause the user device to output the first audio data;

receive a third user input indicating that the first audio data corresponds to the first acoustic event;

in response to the third user input, generate third embedding data using the first embedding data and the second embedding data, the third embedding data having a greater dissimilarity to the second embedding data than the first embedding data; and generate a second custom event profile including the first data and the third embedding data, the second custom event profile representing an update of the first custom event profile.

19. The system of claim 18, wherein the at least one memory includes further instructions that, when executed by the at least one processor, further cause the system to:

in response to the third user input, determine a second condition, the second condition requiring less similarity than the first condition; and associate the second custom event profile with the second condition.

20. The system of claim 13, wherein the at least one memory includes further instructions that, when executed by the at least one processor, further cause the system to;

receive first audio data;

generate second embedding data representing second audio features of the first audio data;

determine a similarity between the first embedding data and the second embedding data;

determine that the similarity satisfies a condition associated with the first custom event profile; and in response to determining that the similarity satisfies the condition, cause the user device to output a notification that an event corresponding to the first natural language description has been detected.

\* \* \* \* \*